(12) United States Patent
Jones

(10) Patent No.: US 9,288,543 B2
(45) Date of Patent: Mar. 15, 2016

(54) SYSTEMS AND METHODS FOR AUTOMATED MEDIA PROGRAMMING (AMP)

(71) Applicant: Martin Kelly Jones, Vancouver (CA)

(72) Inventor: Martin Kelly Jones, Vancouver (CA)

(*) Notice: Subject to any disclaimer, the term of this patent is extended or adjusted under 35 U.S.C. 154(b) by 0 days.

(21) Appl. No.: 14/260,665

(22) Filed: Apr. 24, 2014

(65) Prior Publication Data
US 2014/0237497 A1    Aug. 21, 2014

Related U.S. Application Data

(63) Continuation-in-part of application No. 12/201,000, filed on Aug. 29, 2008, now Pat. No. 9,038,117, which is a continuation-in-part of application No. PCT/US2007/062848, filed on Feb. 27, 2007.

(30) Foreign Application Priority Data

Mar. 1, 2006 (CA) .................................... 2538438

(51) Int. Cl.
*H04N 7/173* (2011.01)
*H04N 21/475* (2011.01)
(Continued)

(52) U.S. Cl.
CPC ...... *H04N 21/4756* (2013.01); *G06F 17/30029* (2013.01); *H04H 20/38* (2013.01); *H04H 60/06* (2013.01); *H04H 60/33* (2013.01);
(Continued)

(58) Field of Classification Search
USPC ........... 725/46, 86, 87, 91–93, 105, 114–117, 725/135
See application file for complete search history.

(56) References Cited

U.S. PATENT DOCUMENTS 6,088,722 A    7/2000  Herz et al.
6,104,989 A    8/2000  Kanevsky et al.
(Continued)

FOREIGN PATENT DOCUMENTS

CN    101897135 A    11/2010
CN    102073671 A    5/2011
(Continued)

OTHER PUBLICATIONS http://web.archive.org/web/20060118050819/http://www.youtube.com/.*

(Continued)

*Primary Examiner* — Nasser Goodarzi
*Assistant Examiner* — Fred Peng
(74) *Attorney, Agent, or Firm* — Thomas | Horstemeyer, LLP

(57) ABSTRACT

Automated media programming (AMP) systems and methods are provided. In one embodiment of an AMP system, a computer server is communicatively coupled to the Internet and provides a website for enabling uploading of media content, sorting the media content, and downloading the media content. Independent users are permitted to submit, edit, rate, and consume media content over a broadcast media channel or network. In some embodiments of the AMP system, content on the Internet is automatically searched and topics from the searched content are automatically identified. The topics are preferably indicative of currently relevant news or events and are indicative of a type of media content that will be requested for uploading from producers. The AMP system publishes the topics to the producers, receives and stores media content uploaded from the producers that relate to the respective topics, and enable users to select and download the media content.

38 Claims, 16 Drawing Sheets

(51) Int. Cl.
    *H04N 21/81*    (2011.01)
    *H04N 21/258*   (2011.01)
    *H04N 21/482*   (2011.01)
    *H04N 21/61*    (2011.01)
    *H04H 20/38*    (2008.01)
    *H04H 60/06*    (2008.01)
    *H04H 60/33*    (2008.01)
    *H04H 60/46*    (2008.01)
    *H04H 60/52*    (2008.01)
    *H04H 60/66*    (2008.01)
    *G06F 17/30*    (2006.01)

(52) U.S. Cl.
    CPC .............. *H04H 60/46* (2013.01); *H04H 60/52* (2013.01); *H04H 60/66* (2013.01); *H04N 21/25891* (2013.01); *H04N 21/4758* (2013.01); *H04N 21/4828* (2013.01); *H04N 21/6125* (2013.01); *H04N 21/6175* (2013.01); *H04N 21/812* (2013.01)

(56) References Cited

U.S. PATENT DOCUMENTS

| | | | |
|---|---|---|---|
| 6,177,931 B1 | 1/2001 | Alexander et al. | |
| 6,493,688 B1 | 12/2002 | Das et al. | |
| 6,574,624 B1 | 6/2003 | Johnson et al. | |
| 7,340,466 B2 | 3/2008 | Odom et al. | |
| 7,657,520 B2 | 2/2010 | Chen et al. | |
| 7,739,261 B2 | 6/2010 | Zeng et al. | |
| 7,836,093 B2 | 11/2010 | Gobeyn et al. | |
| 8,112,310 B1 | 2/2012 | Yehoshua et al. | |
| 8,549,016 B2 | 10/2013 | Stefik et al. | |
| 8,625,904 B2 | 1/2014 | Das et al. | |
| 2005/0097606 A1 | 5/2005 | Scott, III et al. | |
| 2005/0149395 A1* | 7/2005 | Henkin et al. | 705/14 |
| 2006/0184977 A1 | 8/2006 | Mueller et al. | |
| 2006/0195887 A1 | 8/2006 | Shusman | |
| 2007/0016484 A1 | 1/2007 | Waters et al. | |
| 2007/0124425 A1* | 5/2007 | Gross | 709/217 |
| 2007/0198459 A1* | 8/2007 | Boone et al. | 707/1 |
| 2008/0086752 A1* | 4/2008 | Perez | 725/87 |
| 2008/0092168 A1 | 4/2008 | Logan et al. | |
| 2008/0109306 A1 | 5/2008 | Maigret et al. | |
| 2008/0307475 A1 | 12/2008 | Liwerant et al. | |
| 2009/0112906 A1* | 4/2009 | Shuster | 707/102 |
| 2009/0217330 A1 | 8/2009 | Tash | |
| 2009/0254962 A1 | 10/2009 | Hendricks et al. | |
| 2010/0100437 A1* | 4/2010 | Dean et al. | 705/14.52 |
| 2011/0119248 A1 | 5/2011 | Abe et al. | |
| 2012/0084818 A1 | 4/2012 | Ali et al. | |
| 2012/0271829 A1 | 10/2012 | Jason | |

FOREIGN PATENT DOCUMENTS

| | | |
|---|---|---|
| EP | 2 192 500 A2 | 6/2010 |
| WO | 2013/032755 A1 | 3/2013 |

OTHER PUBLICATIONS

Canadian Office Action in co-pending related Canadian Application No. 2,644,314 mailed from the Canadian Patent Office on Apr. 3, 2014. (2 Pages).

http://web.archive.org/web/20060118050819/http://www.youtube.com/ Jan. 18, 2006.

PCT Search Report and Written Opinion in co-pending, related PCT Application No. PCT/US2007/062848, mailed Aug. 29, 2008.

\* cited by examiner

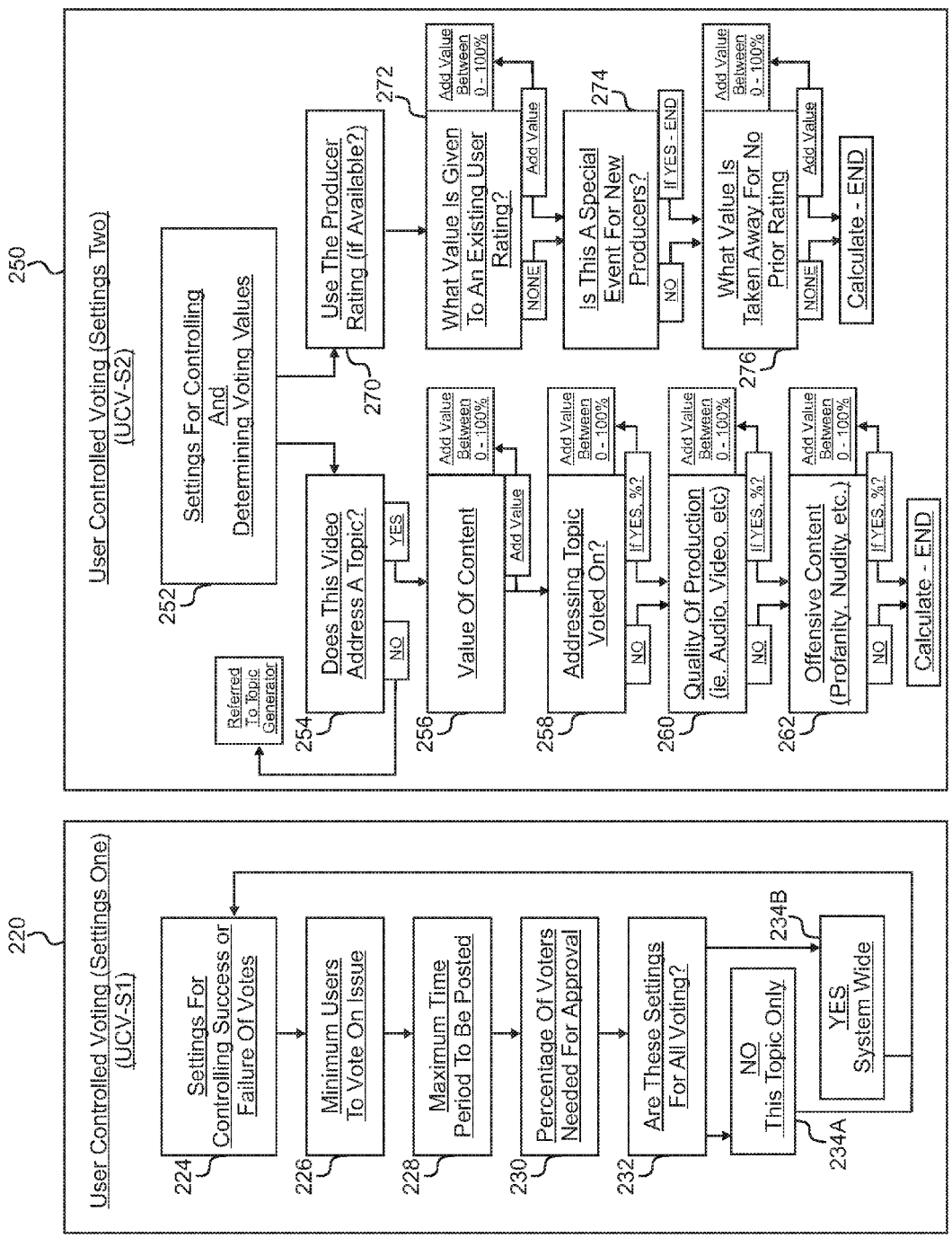

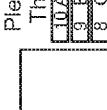

SYSTEMS AND METHODS FOR AUTOMATED MEDIA PROGRAMMING (AMP)

CLAIM OF PRIORITY

This application is a continuation-in-part (CIP) of application Ser. No. 12/201,000, filed Aug. 29, 2008, which is a CIP of international application no. PCT/US07/62848, filed Feb. 27, 2007, which claims the benefit of provisional application no. 2538438, filed Mar. 1, 2006. All of the foregoing applications are incorporated herein by reference in their entireties.

RELATED APPLICATIONS

This application is related to copending application Ser. No. 14/260,638, filed on even date herewith, which is incorporated herein by reference.

FIELD OF THE INVENTION

This invention relates generally to systems and methods for implementing media broadcasting, for example but not limited to, broadcasting in connection with television (TV), the Internet, wireless networks, etc. More particularly, in connection with some embodiments, the invention provides automated media programming (AMP) systems and methods for effectively providing uploaded media content (e.g., videos, images, audio data, multimedia data, etc.) from independent users, addressing predetermined topics, to viewers wanting to observe high quality direct information without normal broadcast editing or censorship in any form (with limited or no edits from the networks' internal management). The foregoing systems and methods can produce other user media content about predefined topics from other users without system operators choosing content and, in many cases, allowing a broadcast to be received by an individual user or group of users, or allowing a mass broadcast (i.e., television, wireless, and/or Internet).

BACKGROUND OF THE INVENTION

Television broadcasting has primarily remained a one-way static industry whose production and distribution techniques have largely been unchanged for years. The techniques through which old networks, such as ABC, CBS, NBC, CNN, FOX, BBC, and others, have created productions over the years has generally remained the same. Using network controlled (owned and operated) analog and/or manually operated cameras, video tape, digital recorders, playback machines, switchers, lighting and editing systems, these and other networks have generated local and national programming combined with commercial content.

No longer are we limited to a few networks for receiving information. There are hundreds of TV stations, Internet sites, ISP applications, media sharing applications, wireless content systems, web phones, news and information toolbars, weather applications, auction assistants, shopping assistants, satellite and local radio stations, in-vehicle guidance systems, and all print and other media.

In a world of information, a source for balanced information that addresses two or more, or perhaps many different viewpoints, is greatly needed and without regard for information that may be critical or negative toward the networks themselves. For example, if an important topic critically addresses a major news agency or station, such as Fox news, this type of information would likely be censored out and not broadcast by Fox. When users want the essence of news, straightforward and pointing out all sides so individual recipients of news may make up their own mind, shaping news for any reason (including to sensationalize) is taking away individual choice and allowing media to be used for user/viewer manipulation. Finding "pure information" or information showing all sides or many different points-of-view, oftentimes results in hours and hours of users searching articles or hours of watching media feeds from different networks. With such information, users attempt to determine what they believe or not believe.

Technology advancements in communication have changed the needs of many individuals from getting information, to managing or implementing techniques for sorting through the amount of the media received. Before 24-hour news programming, such as CNN and others, individuals wanting news would be forced to make themselves available to watch 6:00 pm or 11:00 pm broadcasts.

Today, obtaining unbalanced information at any time and from almost any location has become second nature for many individuals. Recent findings by comScore Media Metrix are that "over half of U.S. adult Internet users have a TV and PC in the same room with half of those reporting they watch TV and use the Net simultaneously."

The challenge is not getting information, but getting pure and quality information. Historically, professional news media, such as TV, radio, Internet sites, newspaper, and magazines, have become overly processed by editors, professional writers, journalists, anchormen, and announcers. Oftentimes, the media represents a particular side or point of view, and many times an unbalanced or biased perspective in order to win-over viewers from competition, to sensationalize, to report from dangerous locations, to say our station has the "exclusive," or to say "you'll only see it here," are important techniques for networks because it is about winning over viewers and increasing revenues.

Therefore, an easily accessible and more direct or pure media broadcast, not influenced by internal operators, owners, or management and bottom-lines, is needed. A pure media source direct from individuals to individuals without network influences and a user-operated broadcast channel or source for playing videos from users on predetermined topics without edits or censorship would be a great source of pure information.

Some attempts, in some form or another, to connect TV with independent users and their statement or views are now broadcast by networks by way of showing emails, statements from Internet sites, and videos that were taken or captured from individuals. While the networks show content taken from individuals and not professionals, the networks select what content will be aired and how the preamble leading into video or text will be made. Not getting around potential censorship or shaped viewpoints, but telling a story as a group or how the organization management wants the story to be told.

Other attempts to air viewer-submitted content are seen in Current TV and ZeD. These companies do not get around censorship, but produce a show with some of it containing uploaded videos. While some videos are directly from users, the management of these companies select "if" something airs. When a lot of viewers recommend a video (green lighted or recommended), it is highly considered by management. If the management agrees to air the video then it airs, then management plays other content before or after user videos. The management has the opportunity to add comments or statements that could affect viewers' perceptions. Just as important, videos are not targeted at predefined topics. Viewers cannot watch videos addressing the same topic, but viewers can watch a random selection of "green lighted" videos that management organizes. At the same time, each video is introduced by a network paid anchorman.

Current TV can be found on channel 366 on DirecTV, providing a range of videos and facts from the Internet of quick short-form video segments targeted at the iPod generation (18 to 35 years of age). Segments called "pods," run between two and five minutes and comprise a "mix and match" of short films on different topics (MTV-type snippets and video blogs). The producers and editors produce, select, and present stories (with presenters), including information, such as statistics from Google on the top 10 news items searched, or survey data like the value of the global cosmetics market. The mix of material is produced by an in-house team of young correspondents, queries from freelancers and submissions from the audience.

As reported by Wired News on 02:00 AM Sep. 14, 2005 PT, the writer Niall McKay writes (complains) about the media programming and selection: "Current TV would do well to hire more smart but witty presenters like Hanson rather than the preened, sickeningly insincere porn-star types that they seem to favor for most of their segments." Maybe the key phrases are "hire" and "they like to favor." Is their selection of what airs, by whom, and when to censor good or bad? They, the producers or correspondents, control every aspect and therefore control the ability to shape content to match a predetermined age group, to match "what they feel" the audience wants, and to censor out or to add additional areas to any story.

Current TV is an independent media company, led by former U.S. Vice President Al Gore, lawyer Joel Hyatt, and a team of industry professionals and young people. The cable television network went on the air in 2005, at midnight EDT (4:00 UTC) on the morning of August 1st. Until the minute before the launch, the channel carried Newsworld International from the CBC. Current TV is based off of an experimental 3-year-old Canadian show called ZeD, both of which rely on viewer-submitted content.

ZeD is a Canadian television series, which bills itself as "open-source television." It premiered in March 2002. The program, which airs every weeknight on the CBC, airs original music, short films, animation, performance, visual art and spoken word pieces from around the world. The subject matter is mature, and each episode begins with a humorously-worded call for viewer's discretion. Each episode is 40 minutes long and there are no advertisements within that time. While the show does not run in the summer, its website allows people to continue viewing certain works, and also upload their creations onto the website, which might then appear on television. Although some films are not available on the website, viewers of the television show can e-mail ZeD and request replays on Fridays, which are dubbed "Feedback Fridays." Altogether, the website claims over 40,000 members.

Yet another way for users to watch videos from-other-users includes upload storage and/or hosting sites, such as You-Tube. YouTube is an online free storage and video viewing website. Currently, YouTube hosts over six million videos and claims to be growing at about 20 percent every month with the current videos taking up 45 terabytes of storage. Other similar sites include blip.tv, Atom Films, Dailymotion, Internet Archive, Google Video, Ourmedia, Revver, Eefoof.com, Panjea.com, dabble.com and many more. Management or owners of these sites have the ability to promote their own chosen materials for the front page. Any information presented to the users, by its management, has the potential to be used for swaying an audience toward its own viewpoint. As an example, YouTube writes: "People always wonder how videos are chosen for the homepage and as part of our effort to improve communication with you, I thought it was time to introduce you to some of our editors and give you a glimpse of what goes on behind the scenes here at YouTube. First up is Big Joe Smith—everyone say, "Hi Joe!"—who made this video for you and then outlined a typical week on homepage duty (including some extra video goodies). Let us know if you like this kind of stuff and we'll make it a regular feature. I'm even charging up the battery on my own video camera and getting out the rouge and mascara . . . —Mia"

One major problem with video hosting sites, with users registered or not, is searchable labeling for the video being correct with only user supplied text. Therefore, existing search engines rely on searchable text, and videos do not have searchable text within each video, unlike most web pages.

As these sites host larger databases of information, the inherent challenges for all users of video hosting type sites are finding relevant and high quality information about specific topics. Even when topics seem to match users' criteria, the time associated with accessing and playing these files, only to determine that the description did not match the actual information, or the quality of the information is poor, sends most users back to text based Internet searches where information is common from users of these sites. Even when users find videos matching searchable descriptions, users normally find these uploaded videos having different subject matter than described.

Another challenge for users wanting high quality videos on specific topics is being able to seek professional, serious, or appropriate acting people in their videos. Others may seek people in videos that come from certain areas, particular backgrounds, have similar life styles, political view points, similar taste in music, have back grounds in topic areas and many other criteria that help people locate specific information by high quality producers and not waste time viewing non-useful information.

Thus, I have recognized that a user-operated broadcast with its "users" having control over content, to the extent possible, is greatly needed. More specifically, there is a need for a broadcast system that allows users to determine topics, that allows users to determine how much time each topic is given (videos discussing a topic for 15, 30, 45, 60 or more minutes), that allows users to edit or make recommendations to the independent producers of videos, that implements a pre-screening rating system and a user "producer" rating system (normally from past videos), that permits information about the producer to also be aired on screen with each video, and/or that implements user selected criteria for automatically forming algorithms that assist in balancing both sides of any topic (for example, the users of this program voted to air 33% democratic view points, 33% republican view points and 34% of other candidates), all without organizational censorship associated with broadcast companies or organizations.

SUMMARY OF THE INVENTION

The present invention provides various embodiments of systems and methods for implementing media broadcasting (television (TV), Internet, wireless, etc.).

One embodiment of the invention, among others, can be summarized as a method for a broadcast system having the following steps: defining a time or time period indicating when media content (videos, images, sound recordings, or other user perceptible information) that pertain to a topic will be broadcast; permitting users to rate the media content that pertains to a topic prior to the time or time period; and broadcasting the media content that meets predefined rating criteria at the time or during the time period. Another embodiment is a broadcast system that is designed to implement the foregoing steps.

Another embodiment of the invention, among others, can be summarized as a broadcast system, comprising a means for permitting users to rate media content (videos, images, sound recordings, or other user perceptible information) that pertains to a topic prior to broadcast; and a means for broadcasting the media content that meets one or more predefined rating criteria.

Other embodiments of the present invention, among others, provide an integrated broadcast media system capable of receiving, managing, generating, and distributing broadcast content to a large number of remote users (viewers). In typical embodiments of this nature, the automation for determining what airs and its calculating criteria is user defined and controlled. Maintaining an openly-controlled media content broadcasting system relies on users, compared to an internal management group, controlling system changes, filters, views, voting criteria, and almost all of the decisions.

In other embodiments, user videos can be selected by an individual CVR (current video rating) on each video in a prescreening area and compared when possible to a UPR (user producer rating) normally averaged from past/other videos from the same user or group. Automated screening from the MCP (media content programming) system may also be utilized (e.g., compliance to length/time, topic, content rating (profanity, nudity), etc.). In this embodiment, in most cases, the requirement for internally paid professional news anchormen, actors, journalist, announcers or anyone that could be influenced by owners or producers from the network, is eliminated.

Some embodiments of the invention automatically broadcast to a TV or an Internet communication system for allowing users to completely or in-part control the broadcast. Such systems and methods involve receiving videos from users and implementing a user video selection (UVS)/rejection pre-screening process for allowing users to rate videos. An email system may also be utilized to notify users when a video was selected for airing, and a broadcast system for automatically airing the selected videos over a TV, Internet, or wireless network.

Additionally, the automatic media content programming (MCP) system may utilize other rating systems for determining the quality of the videos, if videos follow preset agendas/topics and others. There may be time-urgent news (such as in a national state of emergencies, war, etc.) that bypasses the normal (UVS) user video selection process and posts videos for immediate attention (for voting approval). In emergency events, notifications are send to users for fast video uploads and viewing approval of others.

Embodiments of the invention may also include a TG (topic generator 300) that offers topic programming. Topics are determined by users, research (news), seasonal topics, and others. Then users view these topics and develop content based on such topics. Newly added topics may be voted on by users for determining which topics have the highest rating or relevance for collecting content and broadcasting. A higher amount of votes could automatically allow a topic and/or may move it up in a scheduled air broadcast time.

In other embodiments, the broadcast system may be designed to permit users to recommend changes to the MCP internal algorithms and selection processes (ASP) that are part of the programming, code, or methods that determine how videos are selected or displayed.

In yet other embodiments, the broadcast system may be designed to permit users to predefine onscreen viewing positions when full screen videos are not used. As an example, the user may also provide additional personal information or links to additional information, such as a typed transcript or additional information that may be typed or other videos. Another example of additional onscreen information includes a continued (longer or addition) video of what was aired.

In still other embodiments, the broadcast system may be designed to permit users to provide location information (GPS, Mapping, Address, or other location determining information) that may be used for determining the recipients for viewing a location based video. The system allows the recipients to select videos within or at a predetermined location. For example, users in a traffic jam may submit a request for videos within a certain location, within a certain time, on same or similar roads or a point of interest nearby. As another example, users traveling toward roads automatically see road conditions from other cars or land based video cameras. Automatic triggering events for broadcasting road conditions may include actual speed of vehicles, average traffic flows, or distance away from the approaching road.

Another embodiment, among others, is a method for one or more computer servers that are communicatively coupled to the Internet and that provide a website for enabling uploading of media content, sorting the media content, and downloading the media content. The method can be broadly summarized by the following steps: identifying topics that are indicative of currently relevant news or events and that are indicative of types of media content that will be requested for uploading from producers); determining respective profiles for the producers; selecting a topic for a respective producer based upon a respective profile; publishing the topic to the respective producer; receiving and storing a media content uploaded from the producer that relates to the topic; and enabling users to select and download the media content. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment, among others, is a method for one or more computer servers that are communicatively coupled to the Internet and that provide a website for enabling uploading of media content, sorting the media content, and downloading the media content. The method can be broadly summarized by the following steps: identifying a topic that is indicative of currently relevant news or events and that is indicative of a type of media content that will be requested for uploading from producers); publishing the topic to the producers; receiving and storing media content uploaded from the producers that relate to the topic; enabling users to select and download the media content; enabling the users to upload media content ratings for the media content; determining profiles for respective users; determining a producer rating for each of the producers based on the media content ratings and the profiles; and publishing the producer ratings on the website. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Another embodiment, among others, is a method for one or more computer servers that are communicatively coupled to the Internet and that provide a website for enabling uploading of media content, sorting the media content, and downloading the media content. The method can be broadly summarized by the following steps: identifying topics that are indicative of currently relevant news or events and that are indicative of types of media content that will be requested for uploading from producers); publishing topics to the producers; receiving and storing media content uploaded from the producers; determining a respective profile of a user; selecting media content for the user based upon the respective profile; and enabling the user to select and download the media content. An embodiment of a related system has a computer-based architecture with computer software that is stored in one or more memories and executed by one or more processors for performing the foregoing steps. Yet another embodiment of a related system can be implemented in software and/or hardware and has a means for performing each of the aforementioned steps.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 shows a flowchart of the decision determining process for code (DDP-C). The system can allow users to change or modify any element of operational design. The code can be tabbed, tabled, and/or organized for users to access and build recommended changes or add-on modules for other users to review and vote on.

FIG. 4 shows a flowchart of the user controlled voting settings (UCV-S1). These settings control whether the voting is a success or failure for the complete system or individual topics.

FIG. 5 shows a flowchart of the user controlled voting settings (UCV-S2). These settings control the voting values. Voting values are used to calculate components, in this example, videos and producers. Each component's value may be adjusted to reflect importance within each area.

FIG. 13 shows an on-screen area for allowing users to rate videos.

FIG. 14 shows possible methods for enabling the user to rate the producer. Producer ratings may be automatically generated based on historic information or user selections or a combination of these and more.

FIG. 15 shows different possible methods for enabling users to rate aired videos by email or telephone.

DETAILED DESCRIPTION OF PREFERRED EMBODIMENTS

A. Overview

Figure 1:
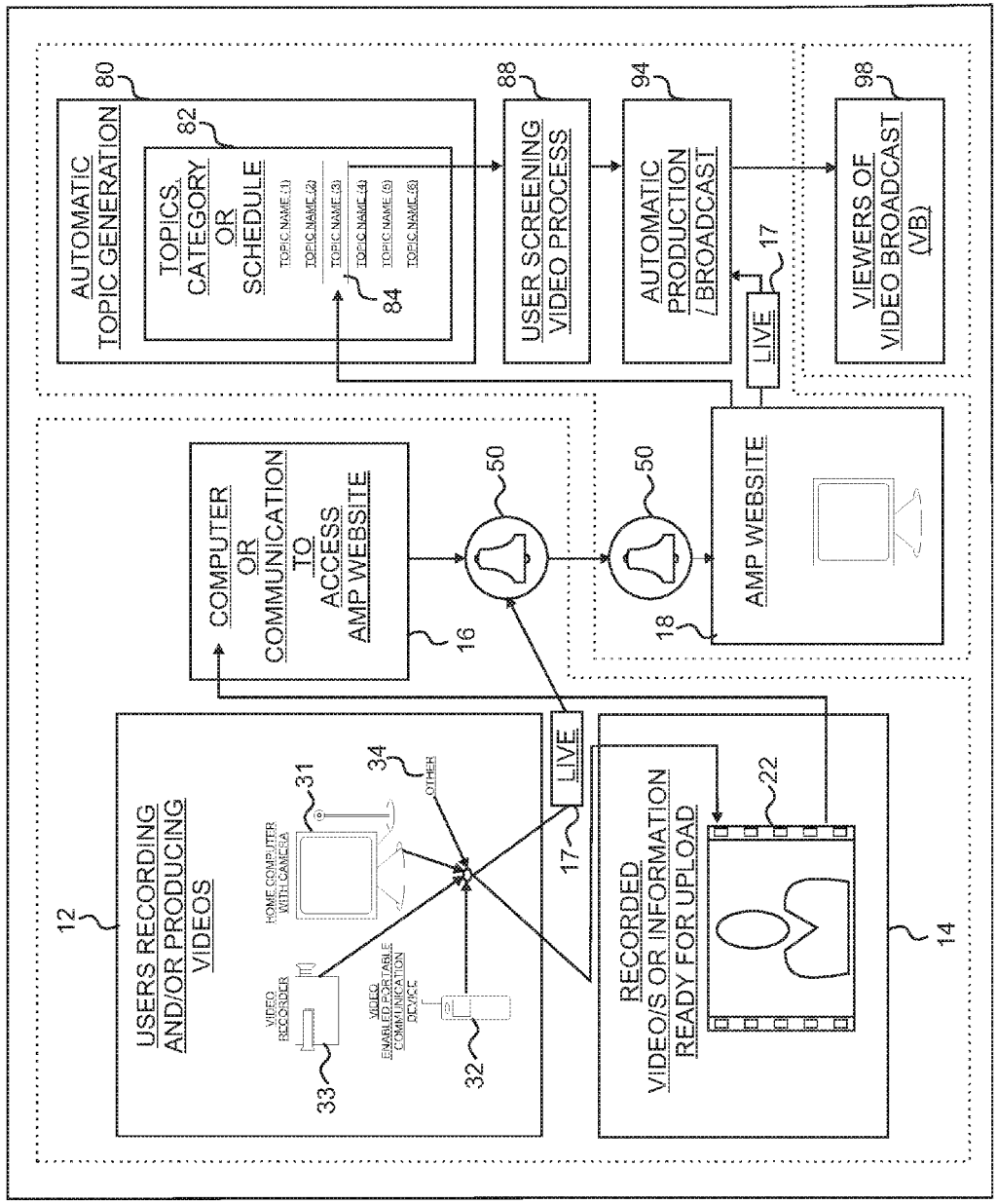
FIG. 1 shows a high-level system diagram of an example embodiment of an automated media programming (AMP) system in accordance with the present invention.

The present disclosure provides various embodiments of systems and methods for implementing media broadcasting (e.g., television (TV), Internet, wireless, etc.). Although not limited to the following configuration, the preferred embodiments of the invention are implemented in software executed on a suitable computer system, i.e., one or more servers, which may or may not have a distributed architecture, that is communicatively coupled to the Internet 938 to enable access by one or more users via other suitable one or more computer systems, i.e., a clients. The one or more servers produce an Internet website 18 that is accessed by the one or more client computer systems 936.

In the preferred embodiments, the automated media programming (AMP) system 900 limits owner or management influenced content, while providing users information on topics 82 with the highest quality media content 22 within a main stream or personalized broadcast. The present disclosure provides personalized broadcast on-demand or user-specific broadcast embodiments, which allow each user to define what determines higher quality media content 22 via matching a user definable preference area. One embodiment, among others, comprises an automatic production system, an automatic broadcasting system, a media content 22 and producer sorting system, a user media content prescreening and rating system, a producer rating system, a producer payment system, an advertisement system, a broadcast viewer rating system, an automated and or manual topic generator 300, and an open architecture configuration and a settings module for allowing users to modify or change one or more system settings. Media content 22 can be a video, an image, an audio data, multimedia data (e.g, a combination of text, audio, still images, animation, video, or interactivity content forms), etc.

The AMP system 900 operates from user information collected by the AMP website 18. Each user visits the AMP website 18 and sets up an account by entering login security, personal self-descriptive information, and personal preference information. Once the user has an account, the user may watch and vote on media content 22 in the prescreening areas, vote on topics 82 or recommend new topics 82, setup criteria for the selection of media content 22, setup personal broadcast information, vote on system changes, and be part of the control process of the AMP system 900.

In the preferred embodiments, a user is defined as either an interactive user (IU) or a viewer only (VO).

B. Media Content

Referring to FIG. 1, for users wanting to become producers, or interactive users (IU), the AMP system 900 acquires its broadcast content by users capturing and then uploading media content 22. The media content 22 can be acquired by portable wireless communication devices 12, for example but not limited to, video enabled PDAs, wireless/cellular phones, camcorders, computers equipped with video capabilities, any device capable of capturing video or still images with narration, etc.

It should also be noted that live media content 17 from producers may also be used within this embodiment. Examples of when live media content feeds are used, include but are not limited to, late breaking news, events or concerts, where two or more users at a location but in different areas that are showing different perspectives or view points, before, during or after a user media content is played, based on a location and people moving.

C. Media Content Uploading Area (UA)

For pre-recorded media content 22, the uploading area (UA) is located on the AMP website 18 and is used for storing and filing media content 22 based on a predefined topic. Each user logs into his/her account before entering into this area. After logging in, the user may access the area by clicking on the tab that is marked "Uploading Area" or otherwise making this selection. Each user may upload media content 22 on a specific topic 82.

The UA area contains a list of topics 82. Each user selects which topic 82 the media content 22 should address. While the user may place media content 22 in the holding tank (limited disk space), this is normally done only for users compiling additional footage and not used as common storage. After edits are completed, and the topic 82 is selected, the user may publish the media content 22 into the prescreening area.

D. Media Content Editing

After the media content 22 is uploaded, the user may select media content editing tools from the menu. Some of the features may include, for example, cutting/pasting, reducing the length, adding narration/audio, changing the background, combining two or more media content 22, rendering media content 22 with animation or user personal information, etc.

The user matches the media content 22 with the topic 82 inside a prescreening room/area. The prescreening area 88 offers other users the ability to watch and rate each media content 22 and producer within this area. In the embodiment for a timed broadcast, unless enough positive votes are received and/or the media content 22 is pre-selected, then the media content 22 will remain in the prescreening area until a deadline has been reached. After the time limit has been reached, the media content 22 is archived for viewers to watch at any time or later date.

In an embodiment where users receive a personalized broadcast, each of the media content 22 will be rated, but stored for retrieval. When user defined information matches this media content 22, it will be selected for a personalized or tailored broadcast.

For media content 22 successfully passing through the voting phase of a timed broadcast, the media content 22 moves from the prescreening area to the preproduction area. The preproduction area organizes media content 22 with a schedule and potentially adds advertisements. The copyright releases and all necessary releases for airing the media content 22 are received at the time of the upload. At this time, the producer (user) is notified on the exact time and date of the airing of the media content 22.

The media content 22 waits in the preproduction area for broadcasting at its scheduled time. Viewers may visit the website 18 or receive programming scheduling updates via email or other wireless messaging service.

Viewers watch scheduled programming of media content 22 from individuals on predefined topics 82. The media content 22 that each viewer watches during a broadcast is media content 22 focusing on topics 82 normally identified with the topic generator 300 of FIG. 6.

E. Control Processes and Systems

To operate a fully automated AMP system 900 without internal management takes user inputs or user recommendations guided by majority votes from other users of the AMP system 900. Many user systems for this embodiment will be described in detail.

F. User Profile

In the preferred embodiment, each user signs up for an account. The information provided in connection with the user account will be utilized when the media content 22 is utilized, such as played, viewed, listening to, etc. As the user obtains a producer rating, the information will help manage topic and broadcast balance (for example, 33% republican, 33% democrat, and 33% independent) along with male/female balancing, age balancing and endless others.

As an example, the user enters the following information:
TABLE-US-00001 "Email account information=myname@host.com" "User Name=" "Password=" "Age=" "Male or Female=" "Political Party=" "Hobbies=" "Published Work or Articles=" "Street Address=City=State=Zip=" "Telephone #=" "Notification Y/N=Selected Topics Only Y/N=" "Please click all topics of interest (see topics list)"

The user profile 901 can also contain historic information, such as a list of uploaded media content 22, amount broadcast to date, average rating of each media content 22, the producer rating, etc. The producer rating may also show the paying level (example, your rating is 6.3—raise your rating by 1.7 to 8.0 and start making money!). The historic information may also provide a rating balance that shows how the user rates against the majority votes.

G. Prescreening Area

The prescreening area (PSA) is where media content 22 waiting for potential airing, is viewed by other members, and rated (for example, 1.0 to 10.0 scale, with 10 the highest rating). As media content 22 is being viewed, questions popup for the reviewer to answer, and at the end of watching or listening to the media content 22, the viewer or listener is asked to rate the media content 22.

As an example, the user can be provided with the following options that can be selected by the user:

1.) Watch media content within the topic area
2.) Rate each media content
3.) You may write the producer a message for encouragement or for suggestions
4.) See which media content make the cut (if they air on a broadcast)
5.) Review feedback from others that have watched or listened to your media content
6.) Ask to be notified via email or in a message area, if someone rates your media content lower than a predefined level.
7.) Notify other reviewers after you have edited your media content.

H. Highest Rated Producer Area

The highest rated producer(s) area allows users to watch the best in action. The best producers are in a list starting from highest rated. To the side of each producer is a tab to review their works, those from the past, and those waiting in the prescreening areas.

I. Production Room

Users with web-access may watch live broadcasts from anywhere. They can watch the same broadcasts as individuals watching on TVs.

J. Audience Rating Area

While the media content 22 is reviewed in the prescreening room by other users, the audience rating area allows viewers (members or non-members) to rate each media content 22 in a broadcast. There are many methods that can be implemented for enabling non-members to rate media content 22, examples of which are as follows:

1.) email response (with media content identification number) with rating
2.) go to AMP website and enter "rate broadcast media content"
3.) call from any telephone, into the AMP interactive voice response telephone entry system
4.) respond to onscreen TV areas
5.) respond to pop ups or video overlays K. User Subsystem Each user subsystem will now be described in detail. These are systems that allow the AMP operations to occur without onsite management or that allow the AMP system 900 to be controlled by its users.

Figure 6:
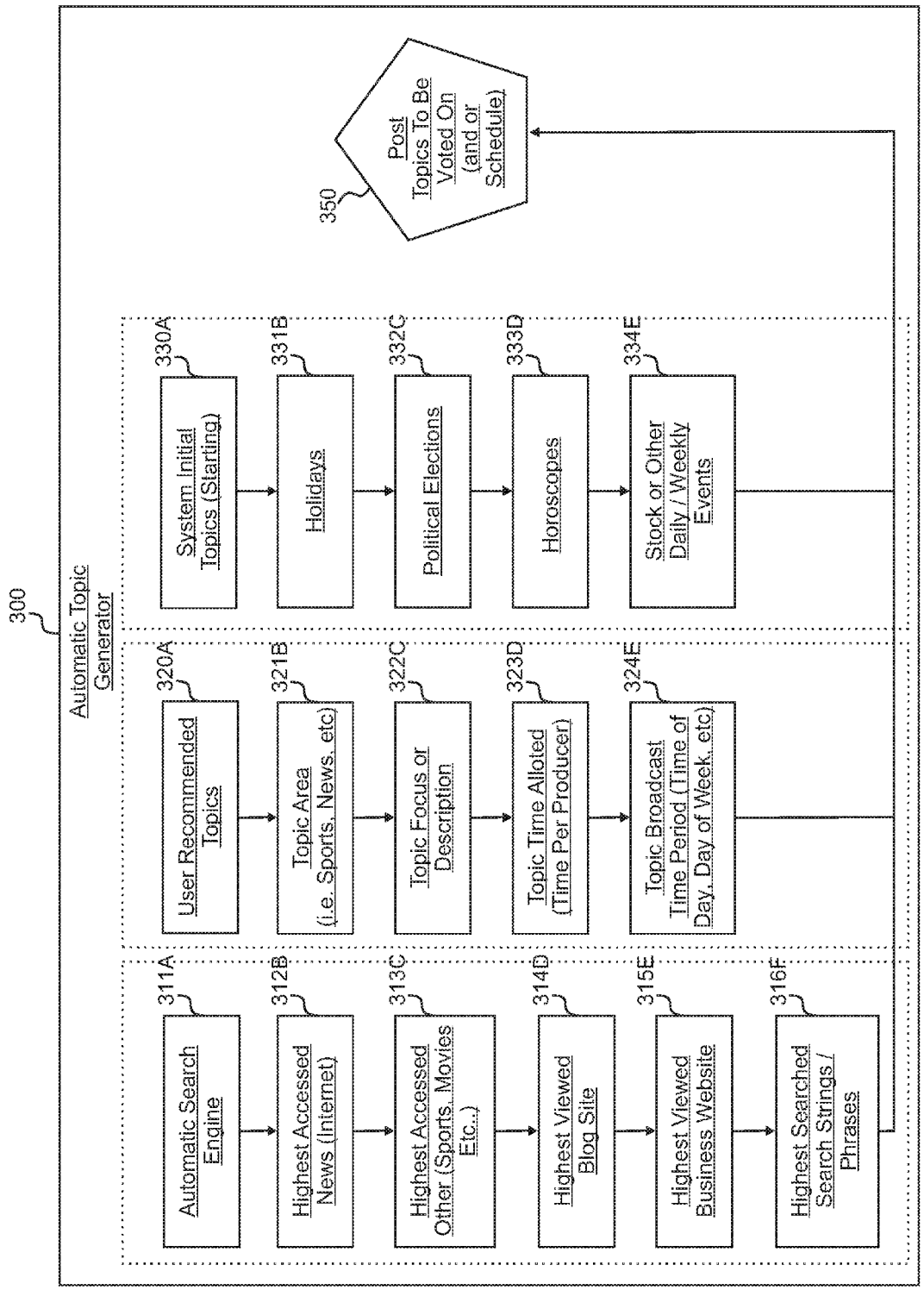
FIG. 6 shows a flowchart of the automatic topic generator (ATG). The diagram shows examples of some of the systems used for generating topics needed soliciting videos from users.

The automatic topic generator 300 of FIG. 6 provides topics 82 to producers. These topics 82 are used as scheduling spots (time periods) that media content 22 address within this time period. A topic 82 is given a total time period by voters. As examples, relevant topics 82 can be generated by the following:

1.) Topics 82 can be identified by searching through content on the Internet. For example, an automatic search engine 80 can be configured to look for, for example, the highest accessed news 86b, sports 86c, movies 86c, blog site 86d, highest viewed business website 86e, highest used search strings 86f, etc.
2.) Topics 82 can be recommended by users. As an example, FIG. 6 shows user recommended topics 87a, where a user names a topic area 87b, description 87c, time allotment 87d and time period 87e.
3.) Topics 82 can be predefined. For example, as shown in FIG. 6, the AMP system 900 can initialize topics 88a, such as holidays 88b, political elections 88c, horoscopes 88d, stock, or daily events 88e. In some embodiments, the topic generator 300 recommends topics, but the users vote on topics that the users would like to see addressed by the media content 22.

Figure 7:
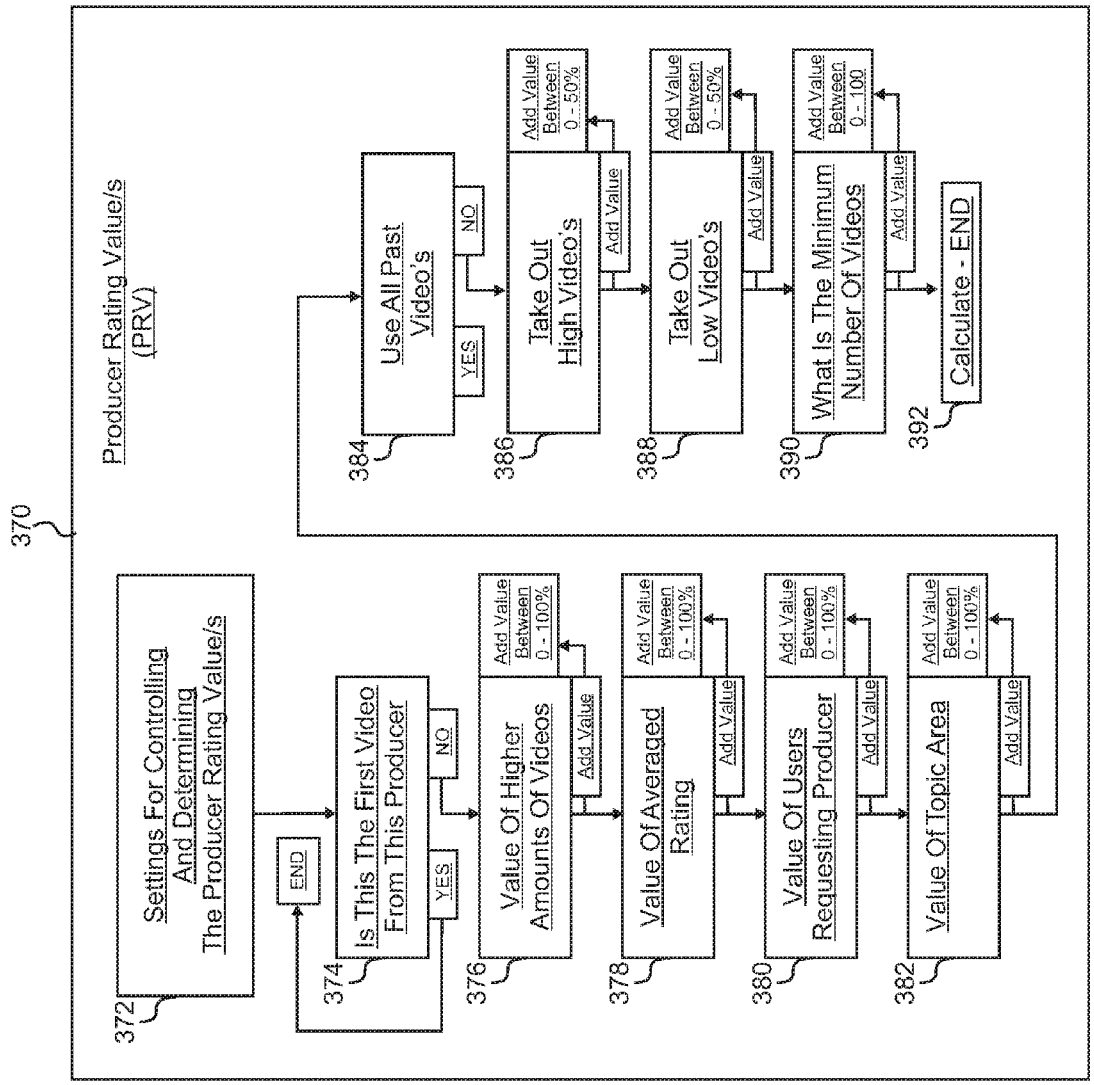
FIG. 7 shows a flowchart for determining the producer rating value (PRV). The producer rating value is sometimes calculated with the video rating, and then used as an overall value for passing or failing user videos.

FIG. 7 shows an example of a subsystem for determining producer rating values (PRV) 370. The producer rating is calculated into a media content rating. For example, the PRV may be 8.0 but the producer's last media content 22 may have been rated a 6.0. The PRV determines the calculation for determining a number for the media content 22. The criteria may include the amount of prior media content 376, the average rating 378, how many users request work from this producer 380, what is the value of the topic area this producer works within the majority of the time 382, use all or some of the past media content 384, 386, 388, what is a minimum number of media content items before calculations start 390, etc.

The users determine the calculations for the most accurate balance between producer ratings and media content ratings. It should be noted that media content 22 controls, at least in part, the producer rating. Examples of FIGS. 13, 14, and 15 show screens for both prescreening and in the broadcast. Media content 22 is judged by AMP users and observers of the AMP broadcast. FIG. 15 shows how a user watching a broadcast on TV may respond (rate) to a media content 22 by email or calling into the system. Additionally, it should be noted that an easier method to rate media content 22 is within an interactive TV system that allows the user to enter a rating on the remote (or keyboard).

Figure 8:
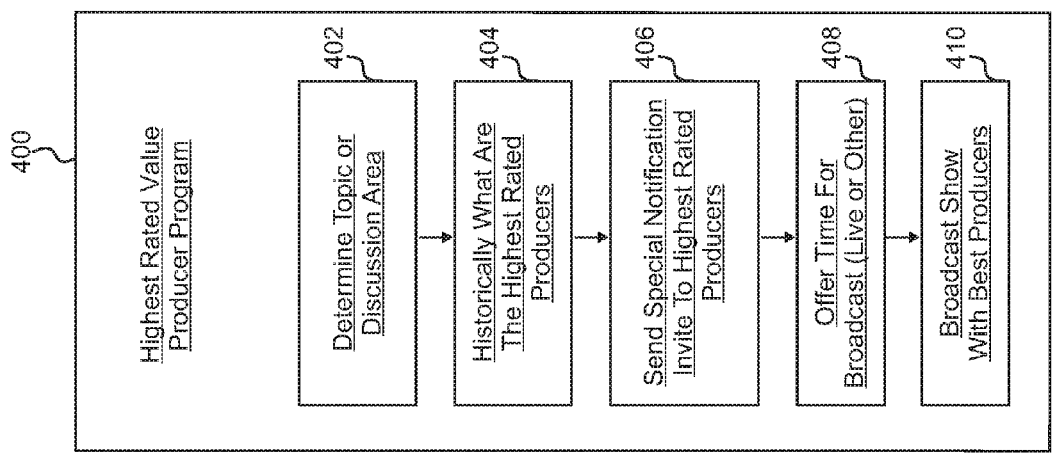
FIG. 8 shows a flowchart for the highest rated producer program (HRPP). The system may promote high rated producers with payments, special broadcasts, or other events.

FIG. 8 shows a highest rated value producer program. This is used for selected programming wherein only the highest producers are invited. As an example, in an emergency where fast responses are necessary, the AMP system 900 may notify the highest rated producers for a fast video or live feed.

Figure 10:
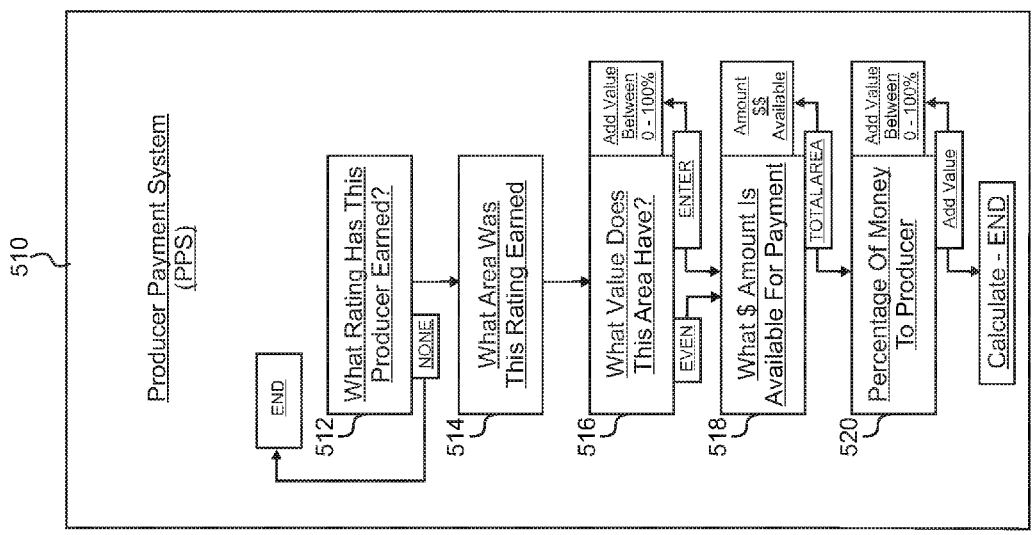
FIG. 10 shows a flowchart of the producer payment system (PPS). As producers achieve high ratings, this system may automatically calculate and pay producers based on one or more ratings. The calculation may also include part of a revenue sharing program or part of the highest producers offering viewers a pay service.

Promoting and supporting the best producers can be achieved, optionally, by payments as is illustrated in FIG. 10. The payments vary in different topic areas 516 by the rating of the producer 514, the total amount of money available for this area 518, and the percentage of the total amount to be paid to the producer 520. While the AMP system 900 over time determines the best producers, each media content 22 and its impact to their rating (or lack of producing media content 22 reduces their rating also) is one of the best forms of management. The automated management system rewards consistently high voted media content production, but gradually removes producers that lose their edge (lower producer and media content ratings). It should be noted, many other paid programs or bonus programs are in effect, such as payments for "fast response" media content 22 (when emergency notification is sent out on a particular topic), "best educational promotion", "best house buying media content," "best investment media content," or any other program that rewards the producer (not necessarily always the producer rating).

Figure 12:
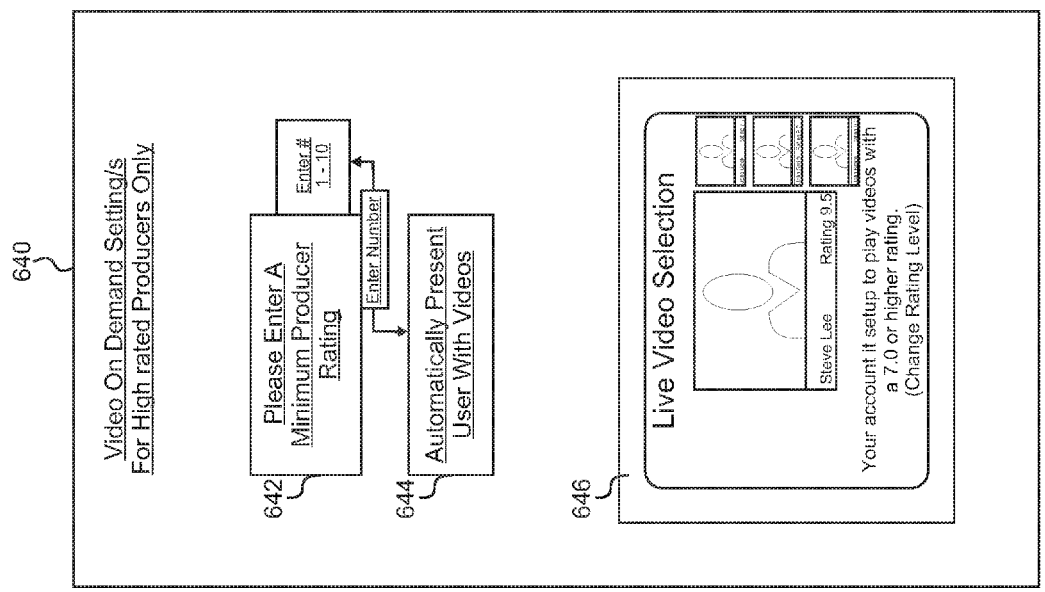
FIG. 12 shows a flowchart and diagram of a video on-demand system. The users may request videos to be played containing only highly rated producers. This allows viewers to not waste time watching videos without ratings or videos with low ratings, acknowledging lower quality.

Additionally, many AMP system setups and usages are possible without listing every scenario herein. The AMP system 900 may be setup to deliver user media content 22 at predefined times or upon request. The AMP system 900 may be setup by users with Internet or network accessible TVs to retrieve media content 22 by predefined criteria such as news. In this form, the AMP system 900 supplies information (media content 22) to users at any time of the day or day of the year. For example, if the user wants to purchase a fuel cell electric car, then the user may request all media content 22 on this topic 82. In this example, the user also chooses "only the highest" rated media content 22, as shown in FIG. 12, from the highest rated producers. Another example includes a user asking for new media content 22 on topics 82 of their choice but the media content 686 and/or producer must have a minimum rating of 7.0.

Figure 9:
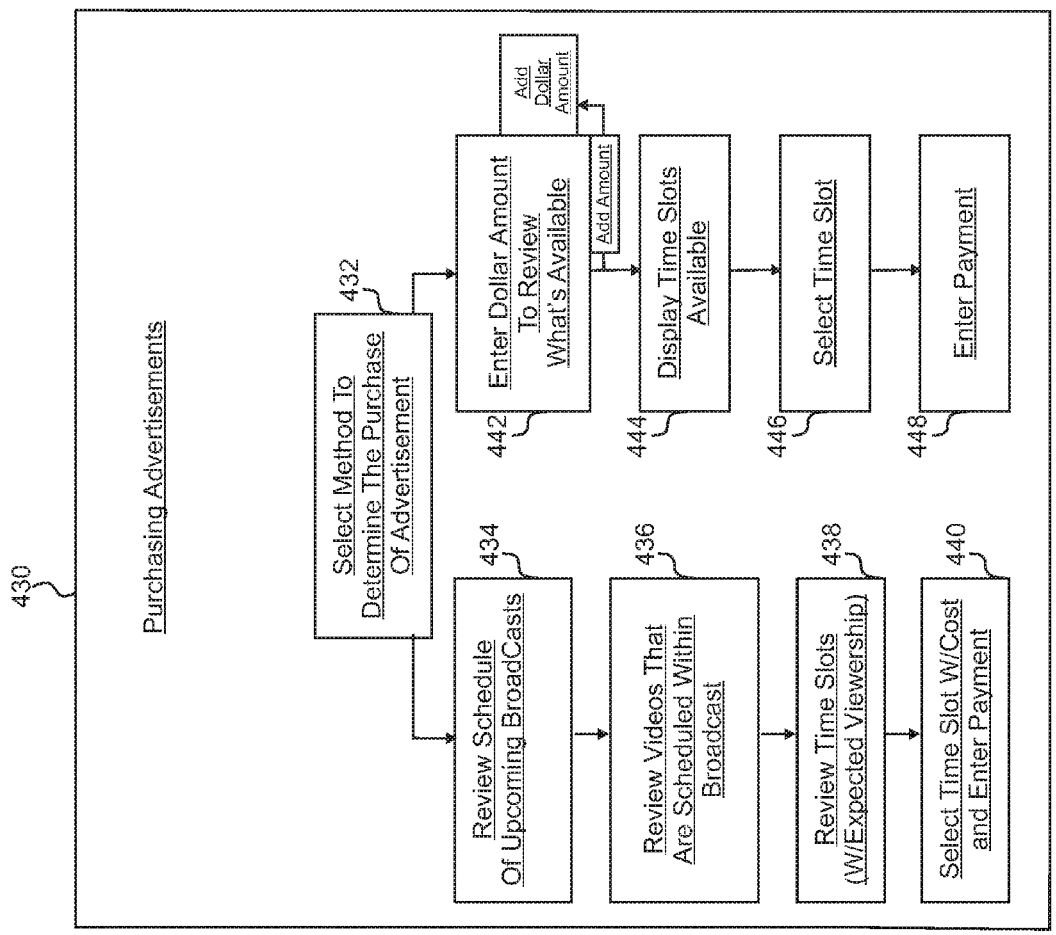
FIG. 9 shows a flowchart of an automated system for the purchase of advertisements. This example allows users wanting to purchase advertisements two options: locate time spots based on upcoming scheduled events and dollar range matching that highlights times and events based on the highest amount a user will pay.

The AMP system 900 may incorporate its own revenue modeling and advertisement selling system. Advertisements, donations, and the promotion of media content 22 to other reporting sources would be the main revenue stream. The purchase/sale of advertisements as shown in FIG. 9, allows users to locate advertisement spots by upcoming broadcasts 434 or simply entering a dollar amount to see what is available 442. Advertisements can go through a review process similar to the media content rating module, although the advertisements pass or fail by the votes.

L. Guidance from User Subsystems

AMP addresses the rules that reflect many aspects of operations as guidance user subsystems. The systems open the architecture to allow a user to change many, if not all, settings and actual systems, even the software code.

Figure 2:
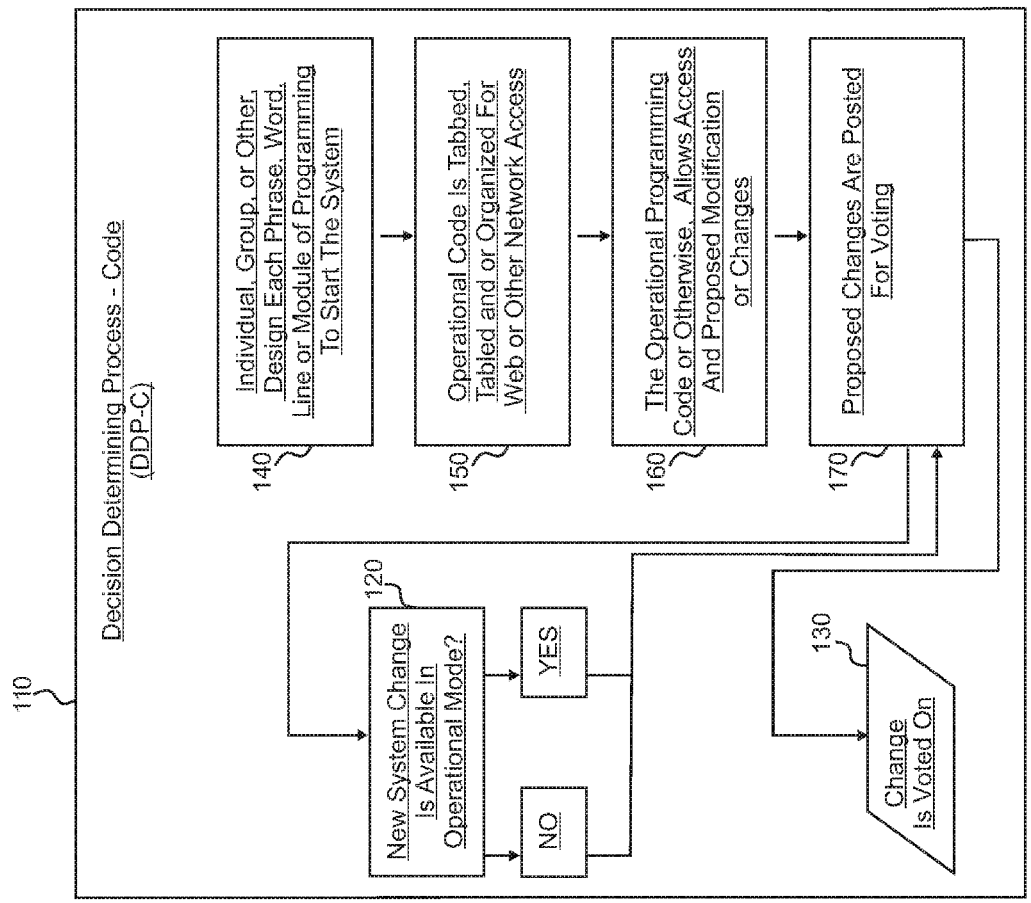

DDP-C is the decision determining process code. As shown in FIG. 2, DDP-C allows users to easily look up code using tabs or other known organization methods. The open architecture allows any user to view and recommend changes to code. The user may select an area that the user believes should be modified, changed, added, or removed. The user may make the change and post it for viewing, as indicated at reference numeral 338. If the change is voted in, then the AMP system 900 is changed.

Figure 3:
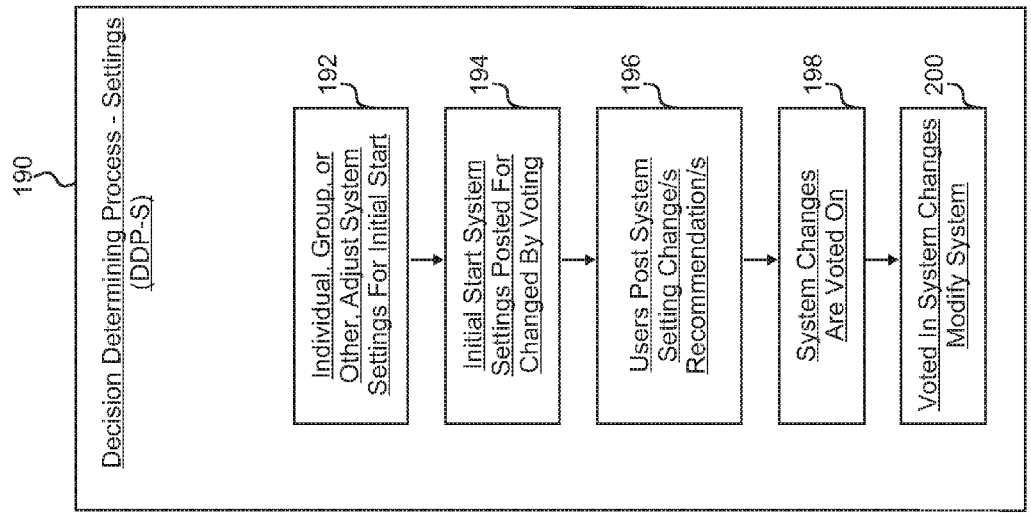
FIG. 3 shows a flowchart of the decision determining process for settings (DDP-S). The AMP system can allow users to change or modify any setting. Users can vote to modify the system.

DDP-S is the decision determining process settings. As shown in FIG. 3, DDP-S allows control settings to be adjusted by the AMP users. User recommend changes 356. These recommendations are voted on, as indicated at reference numeral 358, and when voting approval is given, the AMP system settings are changed, as indicated at reference numeral 360.

Figure 11:
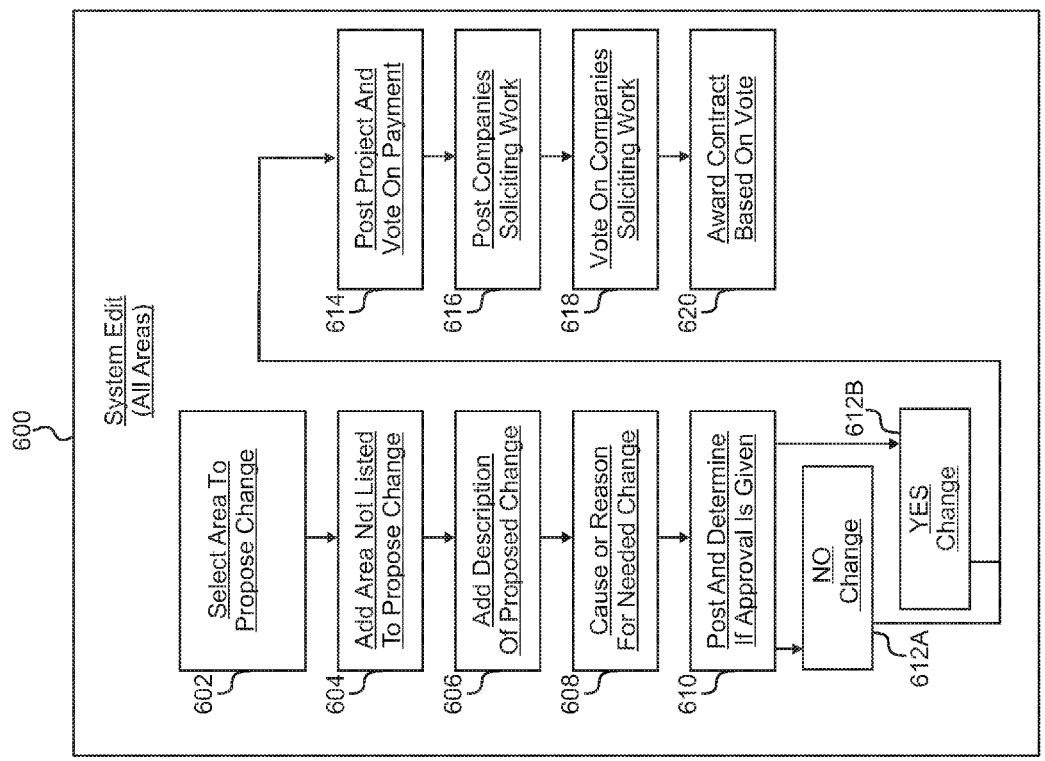
FIG. 11 shows a flowchart of the system edit. Users control the system and may introduce modifications, changes, or additional areas for users to vote on. If a change is passed, then the proposed change may be posted to companies to write new code.
Figure 16:
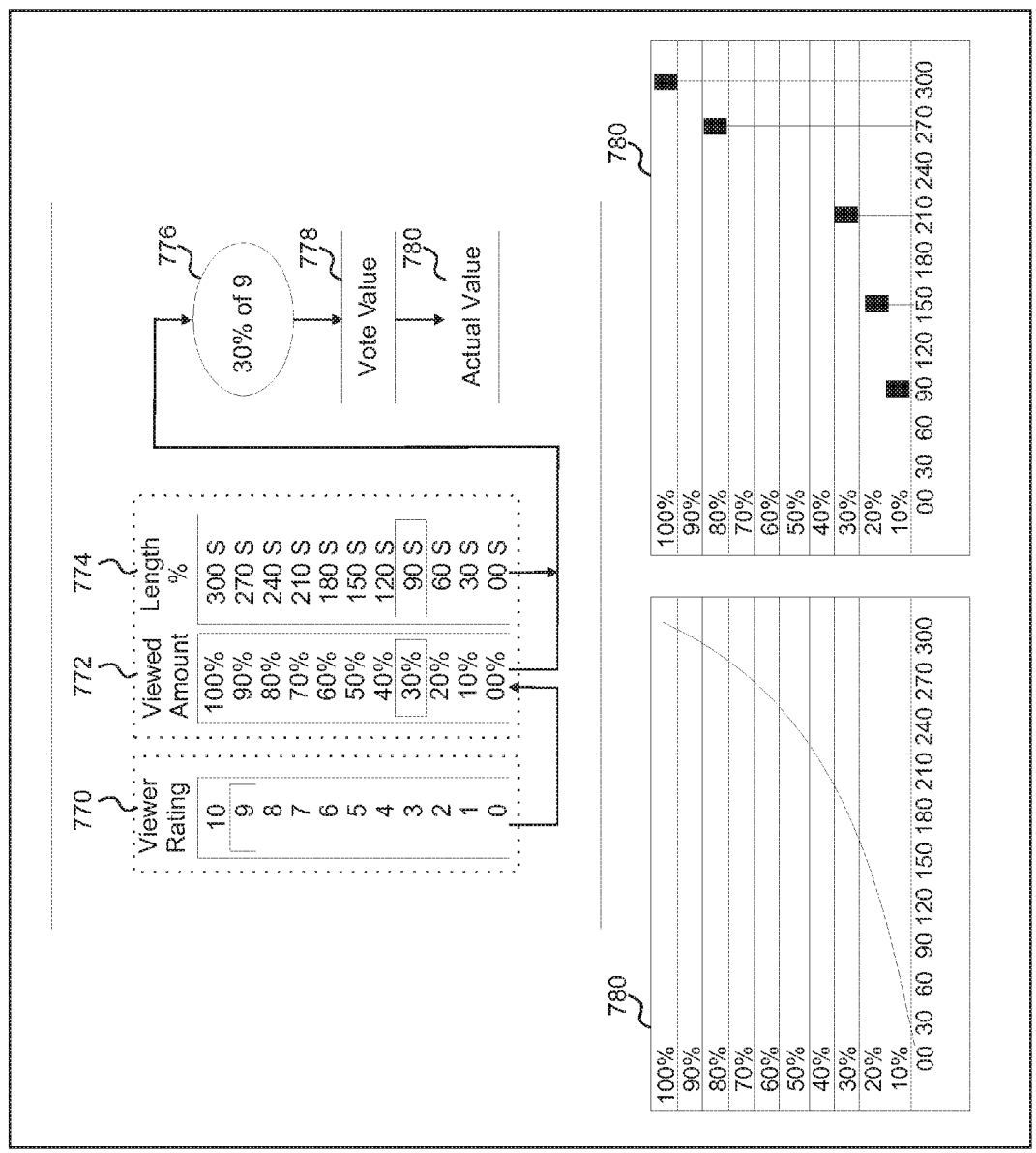
FIG. 16 shows one of the methods for determining the quality of each user's vote to determine the weight, if any, it will be accorded by the system. In this example, a user's vote is compared to the amount of time the user watched the video. Users watching the complete video may have a stronger vote, as opposed to a user that only watches 10% of the video then rates the video. Although not shown here, it should be noted that if a preset percentage (as an example, 90%) of the viewers stop watching the video early, additional calculations may be made to balance the overall rating score.
Figure 18:
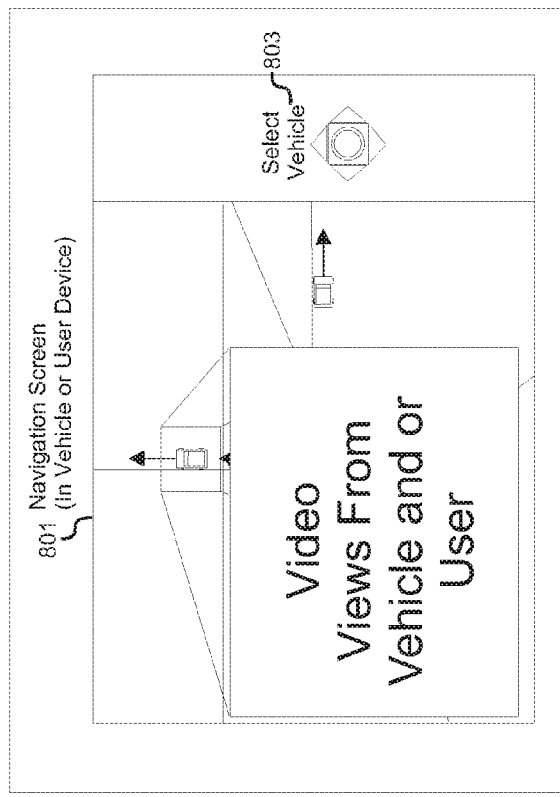
FIGS. 17 and 18 show an example of videos taken while moving (VWM). The example illustrates users recording traffic or road conditions from vehicles equipped with cameras, prior to traveling on these roads.
Figure 17:
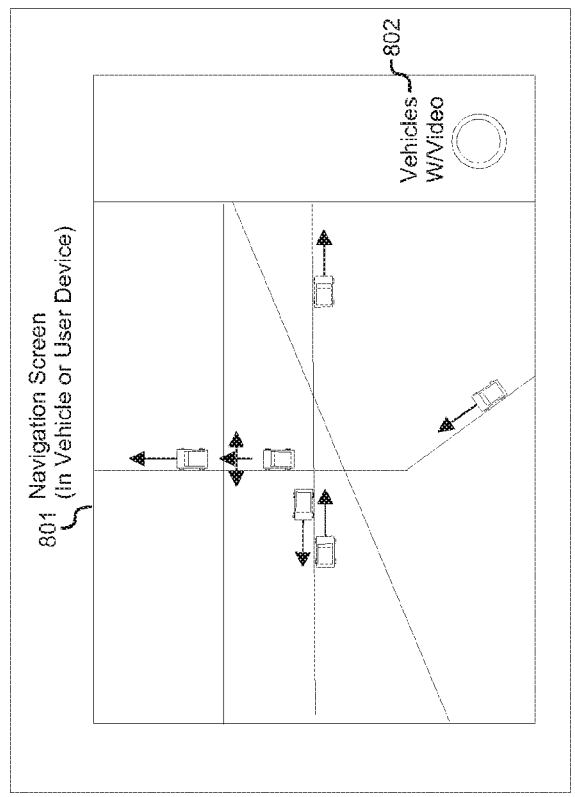
Figure 19:
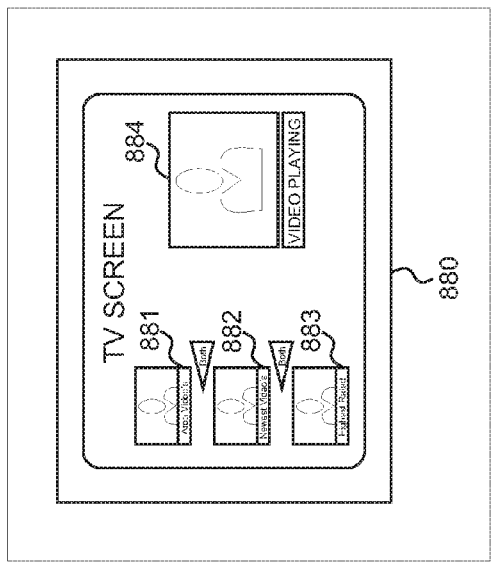
FIGS. 19, 20, 21, and 22 are examples of the many different video selection screens for allowing viewers an opportunity to watch different videos (selecting the newest video, videos with extreme view points, videos with view points based on a location, videos with view points based on the most agreed to, most opposed, or most neutral political view points, and age, etc.) It should be noted that these videos may be sorted by system or user preferences (and may include the highest rated in each area or may include matched user points of view, religion, or other characteristics).
Figure 20:
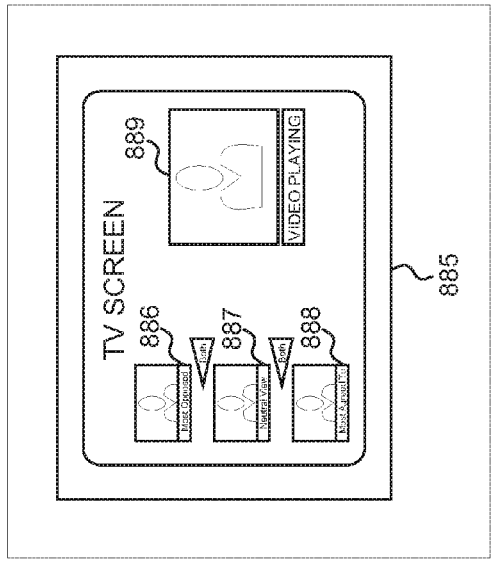
Figure 21:
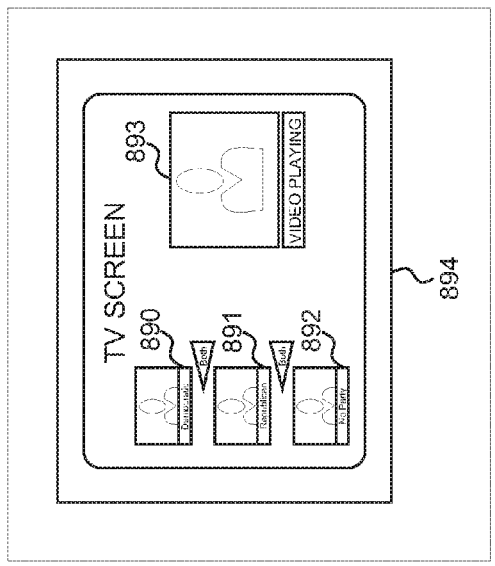
Figure 22:
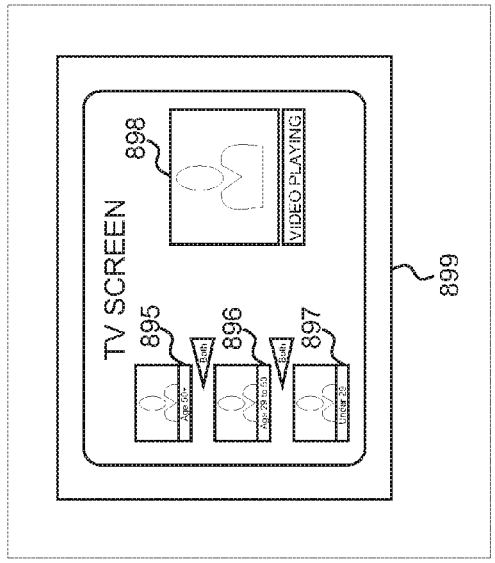

A system edit option (preferably, all areas), as shown in FIG. 11, offers system wide changes as needed. Users can select the area and describe the needed change for others to review as indicated at reference numerals 606, 608. The changes are voted on and incorporated upon approval, as denoted at reference numeral 610.

USV-S1 is an example of a process that controls one aspect of voting (FIG. 4). This system allows the users to enter values, such as minimum users 166 to vote on the issue, maximum time period 168 to be voted on, percentage of voters needed 170, and others.

USV-S2 controls the balancing values between media content ratings and producer ratings (FIG. 5). The determination values are adjusted by giving values to content 186, addressing content 188, quality of production 190, and offensive content 192. The producer rating allows adjustments for existing producers and new producers 222, 224.

Additionally, worth noting, receivers of broadcast may block any producer from their personalized broadcast. In the event that a highly rated producer becomes undesirable or does not match what the viewer is looking for, this producer may be blocked from future broadcasts to this user.

M. Example Architecture of AMP Server

Figure 23:
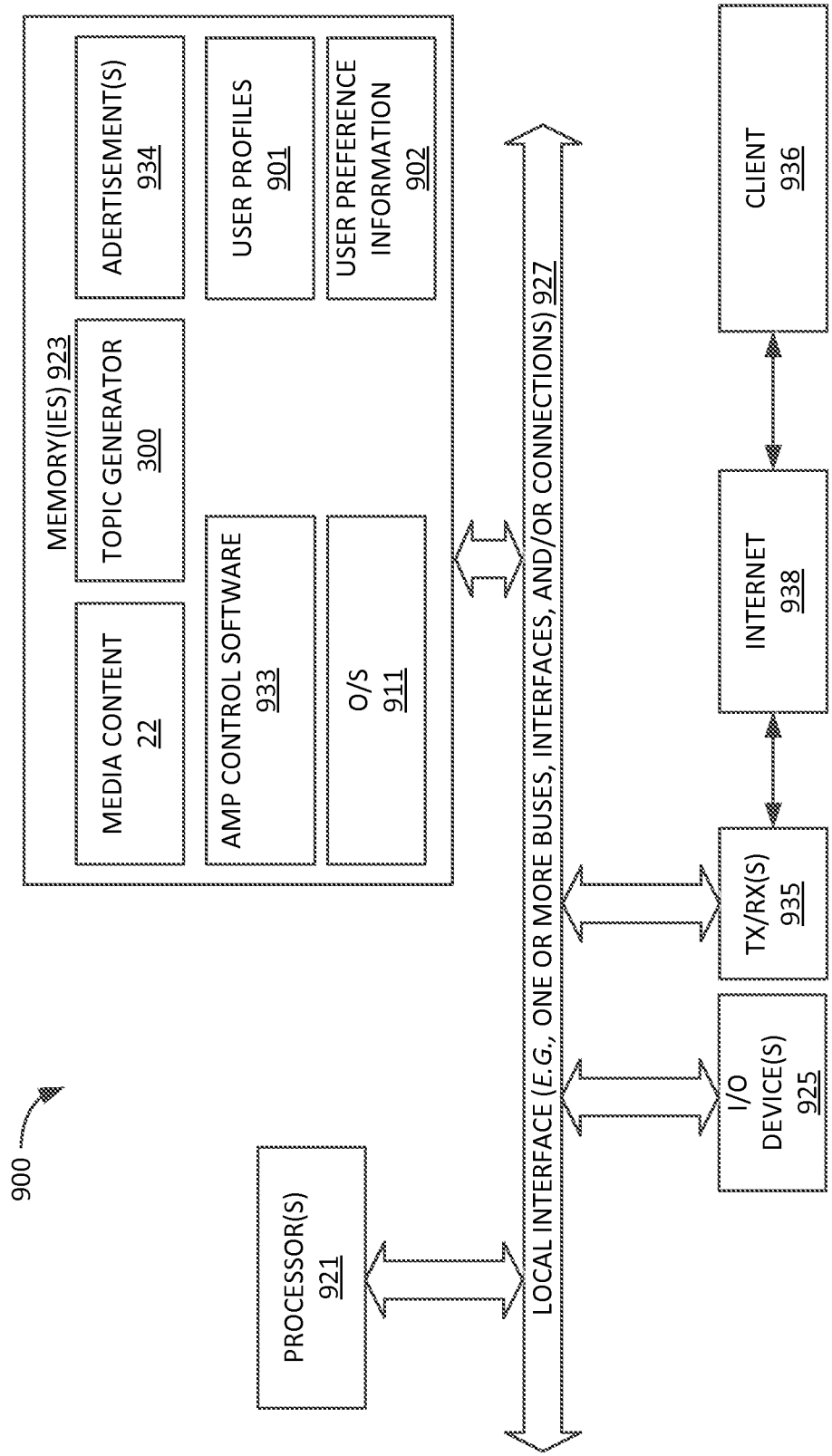
FIG. 23 is an example architecture of the AMP system (server).

FIG. 23 is a block diagram illustrating an example of an AMP system 900 (server) with a computer-based architecture that can communicate with a client(s) 936 with a computer-based architecture over the Internet 938. The AMP system 900 includes a processor(s) 921, such as a microprocessor, a memory(ies) 923, an I/O device(s) 925, and a local interface(s) 927 for communicatively coupling the foregoing elements. The memory 923 comprises all volatile and non-volatile memory elements, including but not limited to, RAM, ROM, etc. The memory 923 comprises the following software: an operating system (O/S) 911, AMP control software 933 designed to implement the control process, and can include the DDP-C and the DDP-S, described previously in this document, and media content 22, which is uploaded by providers and downloaded to users. The computer program code (instructions) associated with the software in memory 923 is executed by the processor 921 in order to perform the methodologies of the present disclosure.

The control software 933 can comprise an ordered listing of executable instructions for implementing logical functions, can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable medium" can be any means that can contain or store the program for use by or in connection with the instruction execution system, apparatus, or device. The non-transitory computer readable medium can be, for example but not limited to, an electronic, magnetic, optical, electromagnetic, infrared, or semiconductor system, apparatus, or device. More specific examples (a non-exhaustive list) of the non-transitory computer-readable medium would include the following: a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) or DVD (optical).

The AMP system 900 is equipped with a suitable transceiver (TX/RX) 935 for enabling communication with the client(s) 936 via the Internet 938. Appropriate software (and protocol stack) for enabling communications with the transceiver 935 can be stored in memory 923 and executed by the processor 921 and/or processor associated with the transceiver 935.

N. Embodiments of AMP Control Software

Figure 24:
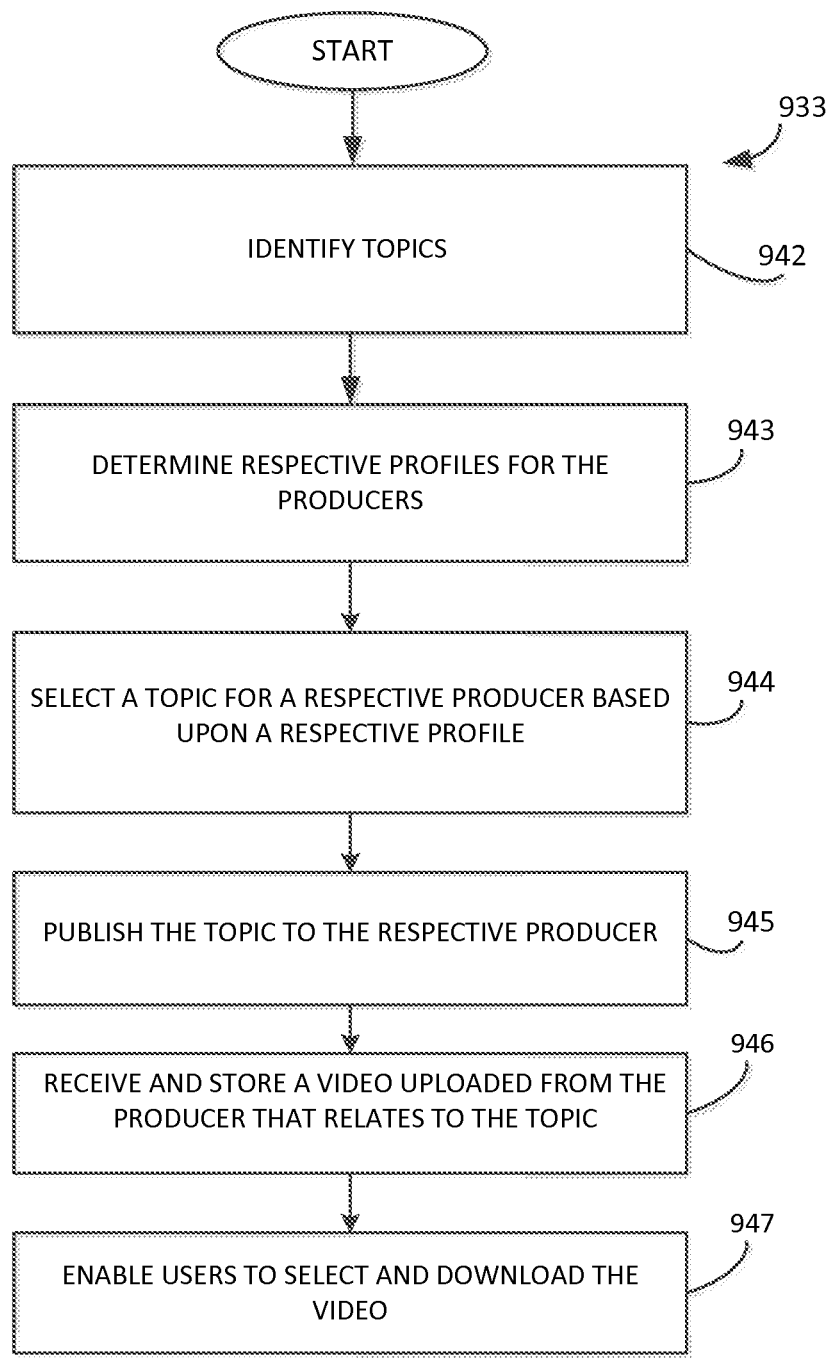
FIGS. 24, 25, and 26 are example architectures of the AMP control software of FIG. 23.

FIG. 24 is a flowchart illustrating a set of embodiments of the AMP control software 933 (FIG. 23). The AMP software 933 can be stored and executed in one or more computer servers 900, such as the one shown in FIG. 23, that are communicatively coupled to the Internet 938 and that provide a website 18 for enabling uploading of media content 22, sorting the media content 22, and downloading the media content 22. Media content 22 can be a video, an image, an audio data, multimedia data (e.g., a combination of text, audio, still images, animation, video, or interactivity content forms), etc. As shown in FIG. 24, the AMP control software 933 includes at least the following program code (or logic): program code 942 designed to identify topics 82 that are indicative of currently relevant news or events and that are indicative of types of media content 22 that will be requested for uploading from producers); program code 943 designed to determine respective profiles 901 for the producers; program code 944 designed to select a topic 82 for a respective producer based upon a respective profile; program code 945 designed to publish the topic 82 to the respective producer; program code 946 designed to receive and store in memory 923 the media content 22 uploaded from the producer that relates to the topic; and program code 947 designed to enable users to select and download the media content 22. Note that uploading and downloading in the context of this disclosure may involve streaming parts of the media content 22 as opposed to communicating complete media content files.

The program code 942 implements the topic generator 300 (FIG. 6). The program code 942 can search through Internet content in order to determine relevant topics, can receive suggested topics 82 from users, etc. The content that is searched on the Internet to establish topics 82 is made available on one or more computer servers associated with any of the following websites: social media, news, twitter, app stores, etc. The program code 944 that is designed to select relevant topics 82 from searching Internet content can use any suitable algorithms for selecting the topics 82 from the Internet content. As examples, the following documents describe techniques that can be employed: U.S. application no. 2012/0271829; U.S. Pat. No. 8,625,904; U.S. application no. 2011/0119248; U.S. Pat. Nos. 6,574,624; 7,340,466; 6,104,989; 7,739,261; 8,549,016; and No. 7,836,093. All of the foregoing disclosures are incorporated herein by reference in their entireties.

The topics 82 can be published, or communicated, to the producers via electronic mail (email), text message, such as a short message service (SMS) message, secure message after the producer logs into the website 18, etc.

In the preferred embodiment of the control software 933, the program code 944 is further designed to determine when a topic 82 is no longer relevant, or stale, and then prevents receipt of any further media content 22 after the determination. This can be accomplished by performing further searches of content on the Internet, by expiration of a predefined time period, etc.

The control software 933 can enable the users to upload media content ratings for the media content 22, determine a producer rating for the producers based at least in part upon the media content ratings, and publish the producer ratings on the AMP website 18.

In some embodiments, the control software 933 can communicate one or more advertisements 934 to a user with downloaded media content 22, or cause communication of such advertisements from a remote computer system to the user. Also, the control software 933 can be designed to determine a profile for the user and select the advertisement 934 based at least in part upon the user profile.

Furthermore, as previously mentioned, in some embodiments, a monetary payment may be made to the producer when the media content 22 is selected, downloaded, or viewed by a user. Producers can earn a living at home by uploading media content 22.

In some embodiments, a plurality of the media content 22 is downloaded to one or more users serially in a stream.

In some embodiments, the AMP control software 933 can be equipped with program code that enables the users to selectively block media content 22 from specific producers. Also, the AMP control software 933 can be equipped with program code that enables the users to select to receive media content 22 from specific producers. Furthermore, the media content 22 may be a live feed from a producer that is communicated from the producer directly to the client device (peer to peer) or from the producer to the client device by way of the AMP server.

Figure 25:
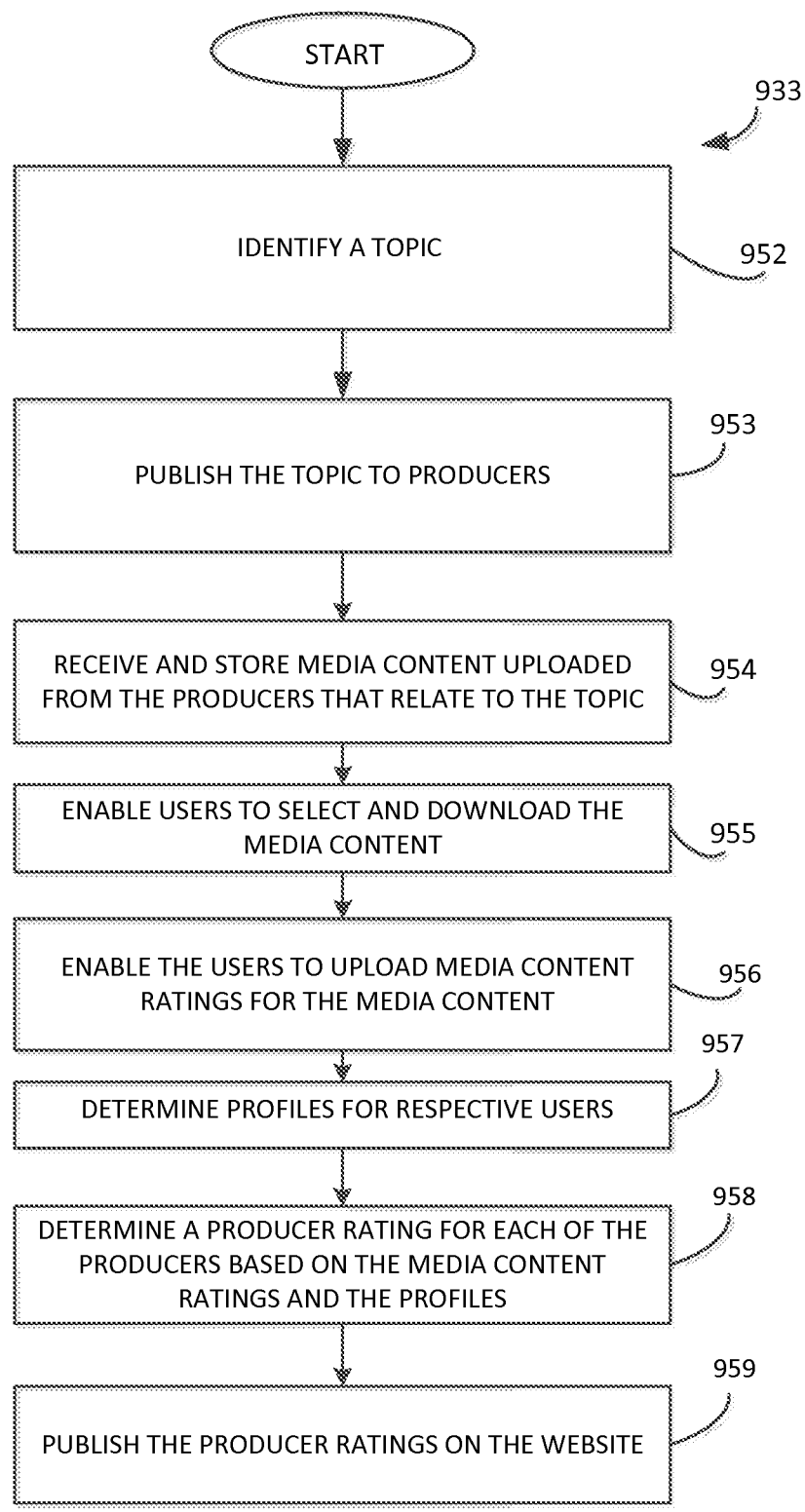

FIG. 25 is a flowchart illustrating a another set of embodiments of the AMP control software 933 (FIG. 23). The AMP software 933 can be stored and executed in one or more computer servers 900, such as the one shown in FIG. 23, that are communicatively coupled to the Internet 938 and that provide a website 18 for enabling uploading of media content 22, sorting the media content 22, and downloading the media content 22. As shown in FIG. 25, the AMP control software 933 includes at least the following program code (or logic): program code 952 designed to identify a topic 82 that is indicative of currently relevant news or events and that is indicative of a type of media content 22 that will be requested for uploading from producers); program code 953 designed to publish, or communicate, the topic 82 to the producers; program code 954 designed to receive and store in memory 923 the media content 22 uploaded from the producers that relate to the topic 82; program code 955 designed to enable users to select and download the media content 22; program code 956 designed to enable the users to upload media content ratings for the media content 22; program code 957 designed to determine profiles 901 for respective users; program code 958 designed to determine a producer rating for each of the producers based on the media content ratings and the profiles 901; and program code 959 designed to publish, or communicate, the producer ratings on the website 18.

The program code 952 in essence implements the topic generator 300 (FIG. 6). The program code 952 can search through Internet content in order to determine relevant topics, can receive suggested topics 82 from users, etc. The content that is searched to establish topics 82 is made available on one or more computer servers associated with any of the following websites: social media, news, twitter, app stores, etc.

The topics 82 can be published, or communicated, to the producers via email, text message, secure message after the producer logs into the website 18, etc.

The control software 933 can enable the users to upload media content ratings for the media content 22, determine a producer rating for the producers based at least in part upon the media content ratings, and publish the producer ratings on the AMP website 18.

In some embodiments, the control software 933 can communicate one or more advertisements 934 to a user with downloaded media content 22, or cause communication of such advertisements from a remote computer system to the user. Also, the control software 933 can be designed to determine a profile for the user and select the advertisement 934 based at least in part upon the user profile.

In some embodiments, a monetary payment may be made to the producer when the media content 22 is selected, downloaded, or viewed by a user. Producers can earn a living at home by uploading media content 22.

In some embodiments, the AMP control software 933 can be equipped with program code that receives and stores user preference information 902 from the users and selects media content 22 to be downloaded to users based at least in part upon the user preference information 902.

In some embodiments, a plurality of the media content 22 is downloaded serially in a stream.

In some embodiments, the AMP control software 933 can be equipped with program code that enables the users to selectively block media content 22 from specific producers. Also, the AMP control software 933 can be equipped with program code that enables the users to select to receive media content 22 from specific producers. Furthermore, the media content 22 may be a live feed from a producer that is communicated from the producer directly to the client device (peer to peer) or from the producer to the client device by way of the AMP server.

Figure 26:
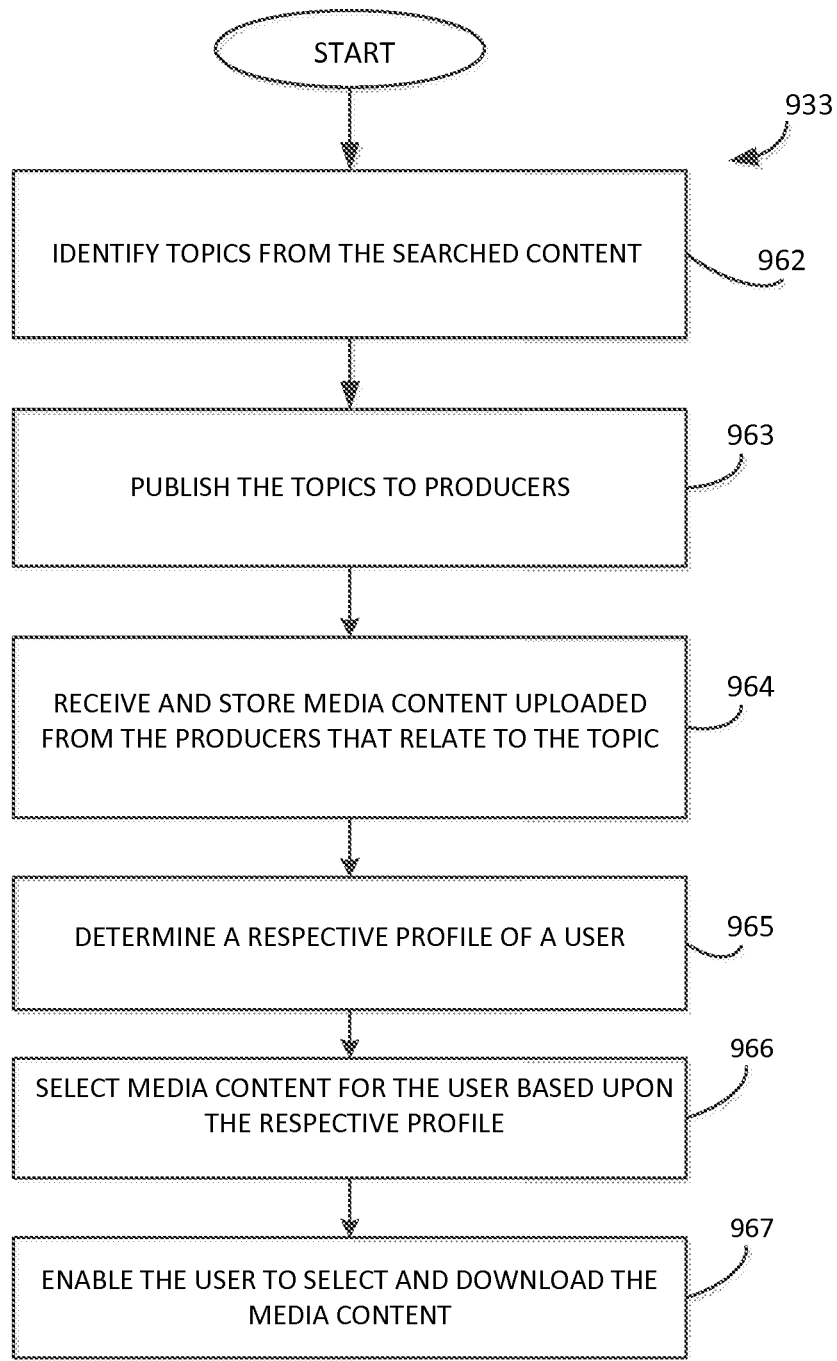

FIG. 26 is a flowchart illustrating yet another set of embodiments of the AMP control software 933 (FIG. 23). The AMP software 933 can be stored and executed in one or more computer servers 900, such as the one shown in FIG. 23, that are communicatively coupled to the Internet 938 and that provide a website 18 for enabling uploading of media content 22, sorting the media content 22, and downloading the media content 22. As shown in FIG. 26, the AMP control software 933 includes at least the following program code (or logic): program code designed to identify topics 82 that are indicative of currently relevant news or events and that are indicative of the types of media content 22 that will be requested for uploading from producers); program code 963 designed to publish, or communicate, the topics 82 to the producers; program code 964 designed to receive and store in memory 923 the media content 22 uploaded from the producers; program code 965 designed to determine a respective profile of a user; program code 966 designed to select media content 22 for the user based upon the respective profile; and program code 967 designed to enable the user to select and download the media content 22.

The program code 962 in essence implements the topic generator 300 (FIG. 6). The program code 962 can search through Internet content in order to determine relevant topics, can receive suggested topics 82 from users, etc. The content that is searched to establish topics 82 is made available on one or more computer servers associated with any of the following websites: social media, news, twitter, app stores, etc.

The topics 82 82 can be published, or communicated, to the producers via email, text message, secure message after the producer logs into the website 18, etc.

The control software 933 can enable the users to upload media content ratings for the media content 22, determine a producer rating for the producers based at least in part upon the media content ratings, and publish the producer ratings on the AMP website 18.

In some embodiments, the control software 933 can communicate one or more advertisements 934 to a user with downloaded media content 22, or cause communication of such advertisements from a remote computer system to the user. Also, the control software 933 can be designed to determine a profile for the user and select the advertisement 934 based at least in part upon the user profile.

In some embodiments, a monetary payment may be made to the producer when the media content 22 is selected, downloaded, or viewed by a user. Producers can earn a living at home by uploading media content 22.

In some embodiments, the AMP control software 933 can be equipped with program code that receives and stores user preference information 902 from the users and selects media content 22 to be downloaded to users based at least in part upon the user preference information 902.

In some embodiments, a plurality of the media content 22 is downloaded serially in a stream.

In some embodiments, the AMP control software 933 can be equipped with program code that enables the users to selectively block media content 22 from specific producers. Also, the AMP control software 933 can be equipped with program code that enables the users to select to receive media content 22 from specific producers. Furthermore, the media content 22 may be a live feed from a producer that is communicated from the producer directly to the client device (peer to peer) or from the producer to the client device by way of the AMP server.

O. Variations and Modifications

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present disclosure and the present invention.

At least the following is claimed:

1. A method for one or more computer servers that are communicatively coupled to the Internet and that provide a website for enabling uploading of media content, sorting the media content, and downloading the media content, the method comprising:

executing computer program instructions stored in one or more memories with one or more processors associated with the one or more computer servers to perform at least the following:

searching content on the Internet in order to identify a topic, the topic indicative of relevant news or events, the topic indicative of a type of media content that will be requested for uploading from one or more producers; publishing the topic to the producers;

receiving and storing media content uploaded from the producers that relate to the topic in the one or more memories;

enabling users to select and download the media content from the website over the Internet; enabling the users to upload media content ratings for the media content to the website over the Internet;

determining a profile for each of the users;

determining the producer rating based at least in part upon the user profiles in addition to the media content ratings;

preventing the download of the media content from a first producer from the website over the Internet based at least in part upon the producer rating associated with the first producer; and permitting the download of the media content from a second producer from the website over the Internet based at least in part upon the producer rating associated with the second producer.

2. The method of claim 1, wherein the executing further performs:

enabling the users and producers to set up user accounts on the website.

3. The method of claim 1, wherein the executing further performs:
publishing the producer ratings on the website.

4. The method of claim 1, wherein the executing further performs:
determining when a topic is no longer relevant; and
preventing receipt of the media content after the determination.

5. The method of claim 1, wherein the executing further performs:
communicating an advertisement to a user with the media content.

6. The method of claim 5, wherein the executing further performs:
selecting the advertisement based at least in part upon the respective profile of the user.

7. The method of claim 5, wherein the executing further performs:
allocating a monetary payment to the producer when the media content is selected, downloaded, or viewed by a user, the monetary payment being a fractional part of revenue received for communication of the advertisement to the user.

8. The method of claim 5, wherein the executing further performs:
enabling a first user to predefine a producer rating threshold; and
preventing the download of the media content from the first producer based at least in part upon the threshold in addition to the producer rating associated with the first producer.

9. The method of claim 5, wherein the executing further performs:
downloading the media content to the users via streaming over the Internet.

10. The method of claim 5, wherein the executing further performs:
enabling a user to upload the topic that is identified.

11. A method for one or more computer servers that are communicatively coupled to the Internet and that provide a website for enabling uploading of media content, sorting the media content, and downloading the media content, the method comprising:
executing computer program instructions stored in one or more memories with one or more processors associated with the one or more computer servers to perform at least the following:
searching content on the Internet in order to identify a topic, the topic indicative of relevant news or events, the topic indicative of a type of media content that will be requested for uploading from one or more producers;
publishing the topic to the producers;
receiving and storing media content uploaded from the producers that relate to the topic in the one or more memories;
enabling users to select and download the media content from the website over the Internet;
enabling the users to upload media content ratings for the media content to the website over the Internet;
determining profiles for respective users;
determining a producer rating for each of the producers based at least in part upon the media content ratings and the user profiles; and
preventing the download of the media content from a producer from the website over the Internet to a user based at least in part upon the producer rating associated with the producer and a predefined threshold.

12. The method of claim 11, wherein the executing further performs:
permitting the download of the media content from another producer from the website over the Internet based at least in part upon the producer rating associated with the another producer.

13. The method of claim 11, wherein the executing further performs:
enabling the users and producers to set up user accounts on the website, prior to downloading and uploading the media content, respectively.

14. The method of claim 11, wherein the executing further performs:
publishing the producer ratings on the website to the users.

15. The method of claim 11, wherein the executing further performs:
determining when a topic is no longer relevant; and
preventing receipt of the media content after the determination.

16. The method of claim 11, wherein the executing further performs:
communicating an advertisement to a user with the media content.

17. The method of claim 16, wherein the executing further performs:
selecting the advertisement based at least in part upon the respective profile of the user.

18. The method of claim 16, wherein the executing further performs:
allocating a monetary payment to the producer when the media content is selected, downloaded, or viewed by a user, the monetary payment being a fractional part of revenue received for communication of the advertisement to the user.

19. The method of claim 11, wherein the executing further performs:
enabling the user to predefine the threshold.

20. A system, comprising:
one or more memories designed to store computer program code; and
one or more processors designed to execute the computer program code stored in the one or more memories, the computer program code designed to cause the one or more processors to perform at least the following:
search content on the Internet in order to identify a topic, the topic indicative of relevant news or events, the topic indicative of a type of media content that will be requested for uploading from one or more producers;
publish the topic to the producers;
receive and store media content uploaded from the producers that relate to the topic in the one or more memories;
enable users to select and download the media content from the website over the Internet;
enable the users to upload media content ratings for the media content to the website over the Internet;
determine a profile for each of the users;
determine the producer rating based at least in part upon the user profiles in addition to the media content ratings;
prevent the download of the media content from a first producer from the website over the Internet based at least in part upon the producer rating associated with the first producer; and permit the download of the media content from a second producer from the website over the Internet based at least in part upon the producer rating associated with the second producer.

21. The system of claim 20, wherein the computer program code is further designed to cause the one or more processors to:
enable the users and producers to set up user accounts on the website.

22. The system of claim 20, wherein the computer program code is further designed to cause the one or more processors to:
publish the producer ratings on the website.

23. The system of claim 20, wherein the computer program code is further designed to cause the one or more processors to:
determine when a topic is no longer relevant; and
prevent receipt of the media content after the determination.

24. The system of claim 20, wherein the computer program code is further designed to cause the one or more processors to:
communicate an advertisement to a user with the media content.

25. The system of claim 24, wherein the computer program code is further designed to cause the one or more processors to:
select the advertisement based at least in part upon the respective profile of the user.

26. The system of claim 20, wherein the computer program code is further designed to cause the one or more processors to:
allocate a monetary payment to the producer when the media content is selected, downloaded, or viewed by a user, the monetary payment being a fractional part of revenue received for communication of the advertisement to the user.

27. The system of claim 20, wherein the computer program code is further designed to cause the one or more processors to:
enable a first user to predefine a producer rating threshold; and
prevent the download of the media content from the first producer based at least in part upon the threshold in addition to the producer rating associated with the first producer.

28. The system of claim 20, wherein the computer program code is further designed to cause the one or more processors to:
download the media content to the users via streaming.

29. The system of claim 20, wherein the computer program code is further designed to cause the one or more processors to:
enable a user to upload the topic that is identified.

30. A system, comprising:
one or more memories designed to store computer program code; and
one or more processors designed to execute the computer program code stored in the one or more memories, the computer program code designed to cause the one or more processors to perform at least the following:
search content on the Internet in order to identify a topic, the topic indicative of relevant news or events, the topic indicative of a type of media content that will be requested for uploading from one or more producers;
publishing the topic to the producers;
receive and store media content uploaded from the producers that relate to the topic in the one or more memories;
enable users to select and download the media content from a website over the Internet;
enable the users to upload media content ratings for the media content to the one or more servers over the Internet;
determine profiles for respective users;
determine a producer rating for each of the producers based at least in part upon the media content ratings and the user profiles; and
prevent the download of the media content from a producer from the website over the Internet to a user based at least in part upon the producer rating associated with the producer and a predefined threshold.

31. The system of claim 30, wherein the computer program code is further designed to cause the one or more processors to:
permit the download of the media content from another producer from the website over the Internet based at least in part upon the producer rating associated with the another producer.

32. The system of claim 30, wherein the computer program code is further designed to cause the one or more processors to:
enable the users and producers to set up user accounts on the website, prior to downloading and uploading the media content, respectively.

33. The system of claim 30, wherein the computer program code is further designed to cause the one or more processors to:
publish the producer ratings on the website to the users.

34. The system of claim 30, wherein the computer program code is further designed to cause the one or more processors to:
determine when a topic is no longer relevant; and
prevent receipt of the media content after the determination.

35. The system of claim 30, wherein the computer program code is further designed to cause the one or more processors to:
communicate an advertisement to a user with the media content.

36. The system of claim 35, wherein the computer program code is further designed to cause the one or more processors to:
select the advertisement based at least in part upon the respective profile of the user.

37. The system of claim 35, wherein the computer program code is further designed to cause the one or more processors to:
allocate a monetary payment to the producer when the media content is selected, downloaded, or viewed by a user, the monetary payment being a fractional part of revenue received for communication of the advertisement to the user.

38. The system of claim 30, wherein the computer program code is further designed to cause the one or more processors to:
enable the user to predefine the threshold.

* * * * *